US012199373B2

(12) United States Patent
Astbury et al.

(10) Patent No.: US 12,199,373 B2
(45) Date of Patent: Jan. 14, 2025

(54) EXTENDER MODULE FOR MODULAR CONNECTOR

(71) Applicant: Amphenol Corporation, Wallingford, CT (US)

(72) Inventors: Allan Astbury, Milford, NH (US); John Robert Dunham, Windham, NH (US); Marc B. Cartier, Jr., Durham, NH (US); Mark W. Gailus, Concord, MA (US); Daniel B. Provencher, Nashua, NH (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 18/208,729

(22) Filed: Jun. 12, 2023

(65) Prior Publication Data

US 2023/0327363 A1 Oct. 12, 2023

Related U.S. Application Data

(63) Continuation of application No. 17/135,753, filed on Dec. 28, 2020, now Pat. No. 11,837,814, which is a (Continued)

(51) Int. Cl.

*H01R 13/648* (2006.01)
*H01R 12/71* (2011.01)

(Continued)

(52) U.S. Cl.

CPC ......... *H01R 13/514* (2013.01); *H01R 12/716* (2013.01); *H01R 12/737* (2013.01);

(Continued)

(58) Field of Classification Search

CPC ............................ H01R 13/658; H01R 12/718

(Continued)

(56) References Cited

U.S. PATENT DOCUMENTS 3,715,706 A 2/1973 Michel et al.
5,137,462 A 8/1992 Casey et al.

(Continued)

FOREIGN PATENT DOCUMENTS

CN 1739223 A 2/2006
CN 100470934 C 3/2009

(Continued)

OTHER PUBLICATIONS

U.S. Appl. No. 17/135,753, filed Dec. 28, 2020, Astbury et al.

(Continued)

*Primary Examiner* — Phuong K Dinh
(74) *Attorney, Agent, or Firm* — Wolf, Greenfield & Sacks, P.C.

(57) ABSTRACT

A modular electrical connector with modular components suitable for assembly into a right angle connector may also be used in forming an orthogonal connector or connector in other desired configurations. The connector modules may be configured through the user of extender modules. Those connector modules may be held together as a right angle connector with a front housing portion, which, in some embodiments, may be shaped differently depending on whether the connector modules are used to form a right angle connector or an orthogonal connector. When designed to form an orthogonal connector, the extender modules may interlock into subarrays, which may be held to other connector components through the use of an extender shell. The mating contact portions on the extender modules may be such that a right angle connector, similarly made with connector modules, may directly mate with the orthogonal connector.

28 Claims, 27 Drawing Sheets

Related U.S. Application Data continuation of application No. 16/200,372, filed on Nov. 26, 2018, now Pat. No. 10,879,643, which is a continuation of application No. 15/216,254, filed on Jul. 21, 2016, now Pat. No. 10,141,676.

(60) Provisional application No. 62/196,226, filed on Jul. 23, 2015.

(51) Int. Cl.

| | |
|---|---|
| ***H01R 12/73*** | (2011.01) |
| ***H01R 13/514*** | (2006.01) |
| ***H01R 13/6471*** | (2011.01) |
| ***H01R 13/6474*** | (2011.01) |
| ***H01R 13/6477*** | (2011.01) |
| ***H01R 13/6587*** | (2011.01) |
| ***H01R 13/659*** | (2011.01) |
| ***H01R 43/20*** | (2006.01) |
| *H01R 13/6461* | (2011.01) |

(52) U.S. Cl.
CPC ..... *H01R 13/6471* (2013.01); *H01R 13/6474* (2013.01); *H01R 13/6477* (2013.01); *H01R 13/6587* (2013.01); *H01R 13/659* (2013.01); *H01R 43/20* (2013.01); *H01R 13/6461* (2013.01)

(58) Field of Classification Search
USPC ...................................... 439/108, 608, 67, 7
See application file for complete search history.

(56) References Cited

U.S. PATENT DOCUMENTS

| | | | | |
|---|---|---|---|---|
| 5,645,436 | A * | 7/1997 | Shimizu ............ | H01R 13/6585 439/607.11 |
| 6,322,379 | B1 | 11/2001 | Ortega et al. | |
| 7,077,658 | B1 | 7/2006 | Ashman et al. | |
| 7,201,607 | B2 | 4/2007 | Bernhart et al. | |
| 7,252,548 | B2 | 8/2007 | Huang | |
| 7,331,830 | B2 | 2/2008 | Minich | |
| 7,354,274 | B2 | 4/2008 | Minich | |
| 7,371,117 | B2 | 5/2008 | Gailus | |
| 7,422,483 | B2 | 9/2008 | Avery et al. | |
| 7,488,188 | B2 * | 2/2009 | Moriyama ............ | H01R 13/26 439/108 |
| 7,494,383 | B2 | 2/2009 | Cohen et al. | |
| 7,540,781 | B2 | 6/2009 | Kenny et al. | |
| 7,581,990 | B2 | 9/2009 | Kirk et al. | |
| 7,585,168 | B2 | 9/2009 | Kato et al. | |
| 7,585,186 | B2 | 9/2009 | McAlonis et al. | |
| 7,588,464 | B2 | 9/2009 | Kim | |
| 7,604,502 | B2 | 10/2009 | Pan | |
| 7,690,946 | B2 | 4/2010 | Knaub et al. | |
| 7,722,401 | B2 | 5/2010 | Kirk et al. | |
| 7,731,537 | B2 | 6/2010 | Amleshi et al. | |
| 7,744,414 | B2 | 6/2010 | Scherer et al. | |
| 7,753,731 | B2 | 7/2010 | Cohen et al. | |
| 7,771,233 | B2 | 8/2010 | Gailus | |
| 7,775,802 | B2 | 8/2010 | Defibaugh et al. | |
| 7,789,676 | B2 | 9/2010 | Morgan et al. | |
| 7,794,240 | B2 | 9/2010 | Cohen et al. | |
| 7,794,278 | B2 | 9/2010 | Cohen et al. | |
| 7,806,729 | B2 | 10/2010 | Nguyen et al. | |
| 7,811,129 | B2 | 10/2010 | Glover et al. | |
| 7,871,296 | B2 | 1/2011 | Fowler et al. | |
| 7,874,873 | B2 | 1/2011 | Do et al. | |
| 7,887,371 | B2 | 2/2011 | Kenny et al. | |
| 7,887,379 | B2 | 2/2011 | Kirk | |
| 7,906,730 | B2 | 3/2011 | Atkinson et al. | |
| 7,914,304 | B2 | 3/2011 | Cartier et al. | |
| 7,976,318 | B2 | 7/2011 | Fedder et al. | |
| 7,985,097 | B2 | 7/2011 | Gulla | |
| 8,016,616 | B2 | 9/2011 | Glover et al. | |
| 8,057,267 | B2 | 11/2011 | Johnescu | |
| 8,083,553 | B2 | 12/2011 | Manter et al. | |
| 8,100,699 | B1 | 1/2012 | Costello | |
| 8,167,651 | B2 | 5/2012 | Glover et al. | |
| 8,182,289 | B2 | 5/2012 | Stokoe et al. | |
| 8,215,968 | B2 | 7/2012 | Cartier et al. | |
| 8,216,001 | B2 | 7/2012 | Kirk | |
| 8,251,745 | B2 | 8/2012 | Johnescu | |
| 8,272,877 | B2 | 9/2012 | Stokoe et al. | |
| 8,371,875 | B2 | 2/2013 | Gailus | |
| 8,371,876 | B2 | 2/2013 | Davis | |
| 8,382,524 | B2 | 2/2013 | Khilchenko et al. | |
| 8,398,431 | B1 | 3/2013 | Whiteman, Jr. et al. | |
| 8,469,745 | B2 | 6/2013 | Davis et al. | |
| 8,550,861 | B2 | 10/2013 | Cohen et al. | |
| 8,628,356 | B2 | 1/2014 | Laurx et al. | |
| 8,657,627 | B2 | 2/2014 | McNamara et al. | |
| 8,668,522 | B2 | 3/2014 | Becker et al. | |
| 8,678,860 | B2 | 3/2014 | Minich et al. | |
| 8,715,003 | B2 | 5/2014 | Buck et al. | |
| 8,715,005 | B2 | 5/2014 | Pan | |
| 8,734,167 | B2 | 5/2014 | Aimoto | |
| 8,771,016 | B2 | 7/2014 | Atkinson et al. | |
| 8,814,595 | B2 | 8/2014 | Cohen et al. | |
| 8,864,521 | B2 | 10/2014 | Atkinson et al. | |
| 8,926,377 | B2 | 1/2015 | Kirk et al. | |
| 8,944,831 | B2 | 2/2015 | Stoner et al. | |
| 8,998,642 | B2 | 4/2015 | Manter et al. | |
| 9,004,942 | B2 | 4/2015 | Paniauqa | |
| 9,022,806 | B2 | 5/2015 | Cartier, Jr. et al. | |
| 9,028,281 | B2 | 5/2015 | Kirk et al. | |
| 9,065,230 | B2 | 6/2015 | Milbrand, Jr. | |
| 9,124,009 | B2 | 9/2015 | Atkinson et al. | |
| 9,184,530 | B2 | 11/2015 | Cohen | |
| 9,219,335 | B2 | 12/2015 | Atkinson et al. | |
| 9,225,085 | B2 | 12/2015 | Cartier, Jr. et al. | |
| 9,300,074 | B2 | 3/2016 | Gailus | |
| 9,450,344 | B2 | 9/2016 | Cartier, Jr. et al. | |
| 9,484,674 | B2 | 11/2016 | Cartier, Jr. et al. | |
| 9,509,101 | B2 | 11/2016 | Cartier, Jr. et al. | |
| 9,520,689 | B2 | 12/2016 | Cartier, Jr. et al. | |
| 9,564,696 | B2 | 2/2017 | Gulla | |
| 9,608,382 | B2 | 3/2017 | McClellan et al. | |
| 9,685,736 | B2 | 6/2017 | Gailus et al. | |
| 9,705,255 | B2 | 7/2017 | Atkinson et al. | |
| 9,905,975 | B2 | 2/2018 | Cartier, Jr. et al. | |
| 10,122,129 | B2 | 11/2018 | Milbrand, Jr. et al. | |
| 10,141,676 | B2 | 11/2018 | Astbury et al. | |
| 10,211,577 | B2 | 2/2019 | Milbrand, Jr. et al. | |
| 10,243,304 | B2 | 3/2019 | Kirk et al. | |
| 10,348,040 | B2 | 7/2019 | Cartier, Jr. et al. | |
| 10,381,767 | B1 | 8/2019 | Milbrand, Jr. et al. | |
| 10,431,936 | B2 | 10/2019 | Horning et al. | |
| 10,511,128 | B2 | 12/2019 | Kirk et al. | |
| 10,707,626 | B2 | 7/2020 | Cartier, Jr. et al. | |
| 10,879,643 | B2 | 12/2020 | Astbury et al. | |
| 11,688,980 | B2 | 6/2023 | Cartier, Jr. et al. | |
| 11,837,814 | B2 | 12/2023 | Astbury et al. | |
| 2003/0092320 | A1 | 5/2003 | Evans | |
| 2003/0203676 | A1 | 10/2003 | Hasircoglu | |
| 2006/0014433 | A1 | 1/2006 | Consoli et al. | |
| 2007/0155149 | A1 | 7/2007 | Zhao et al. | |
| 2008/0214055 | A1 | 9/2008 | Gulla | |
| 2008/0246555 | A1 | 10/2008 | Kirk et al. | |
| 2008/0248658 | A1 | 10/2008 | Cohen et al. | |
| 2008/0248659 | A1 | 10/2008 | Cohen et al. | |
| 2008/0248660 | A1 | 10/2008 | Kirk et al. | |
| 2009/0011641 | A1 | 1/2009 | Cohen et al. | |
| 2009/0011645 | A1 | 1/2009 | Laurx et al. | |
| 2009/0017681 | A1 | 1/2009 | Amleshi et al. | |
| 2009/0035955 | A1 | 2/2009 | McNamara | |
| 2009/0061661 | A1 | 3/2009 | Shuey et al. | |
| 2009/0093158 | A1 | 4/2009 | McAlonis et al. | |
| 2009/0117386 | A1 | 5/2009 | Vacanti et al. | |
| 2009/0203259 | A1 | 8/2009 | Nguyen et al. | |
| 2009/0239395 | A1 | 9/2009 | Cohen et al. | |
| 2009/0258516 | A1 | 10/2009 | Hiew et al. | |
| 2009/0291593 | A1 | 11/2009 | Atkinson et al. | |
| 2009/0305533 | A1 | 12/2009 | Feldman et al. | |

(56) References Cited

U.S. PATENT DOCUMENTS

2009/0305553 A1 12/2009 Thomas et al.
2009/0311908 A1 12/2009 Fogg et al.
2010/0015822 A1 1/2010 Morgan et al.
2010/0048058 A1 2/2010 Morgan et al.
2010/0081302 A1 4/2010 Atkinson et al.
2010/0144167 A1 6/2010 Fedder et al.
2010/0144169 A1 6/2010 Glover et al.
2010/0144175 A1 6/2010 Helster et al.
2010/0291803 A1 11/2010 Kirk
2010/0291806 A1 11/2010 Minich et al.
2010/0294530 A1 11/2010 Atkinson et al.
2011/0003509 A1 1/2011 Gailus
2011/0104948 A1 5/2011 Girard, Jr. et al.
2011/0117781 A1 5/2011 Stoner
2011/0130038 A1 6/2011 Cohen et al.
2011/0212649 A1 9/2011 Stokoe et al.
2011/0212650 A1 9/2011 Amleshi et al.
2011/0230095 A1 9/2011 Atkinson et al.
2011/0230096 A1 9/2011 Atkinson et al.
2011/0256739 A1 10/2011 Toshiyuki et al.
2011/0287663 A1 11/2011 Gailus et al.
2012/0058684 A1 3/2012 De Geest et al.
2012/0077380 A1 3/2012 Minich et al.
2012/0094536 A1 4/2012 Khilchenko et al.
2012/0156929 A1 6/2012 Manter et al.
2012/0184154 A1 7/2012 Frank et al.
2012/0202363 A1 8/2012 McNamara et al.
2012/0202386 A1 8/2012 McNamara et al.
2012/0214344 A1 8/2012 Cohen et al.
2012/0242363 A1 9/2012 Breinlinger et al.
2013/0012038 A1 1/2013 Kirk et al.
2013/0017733 A1 1/2013 Kirk et al.
2013/0065454 A1 3/2013 Milbrand, Jr.
2013/0078870 A1 3/2013 Milbrand, Jr.
2013/0078871 A1 3/2013 Milbrand, Jr.
2013/0109232 A1* 5/2013 Paniaqua ............... H01R 43/00
439/607.07
2013/0143442 A1 6/2013 Cohen et al.
2013/0157512 A1 6/2013 Regnier et al.
2013/0183869 A1 7/2013 Minich et al.
2013/0189858 A1 7/2013 Johnescu et al.
2013/0196553 A1 8/2013 Gailus
2013/0210246 A1 8/2013 Davis et al.
2013/0217263 A1* 8/2013 Pan .................... H01R 13/6587
439/607.07
2013/0225006 A1 8/2013 Khilchenko et al.
2013/0288521 A1 10/2013 McClellan et al.
2013/0288525 A1 10/2013 McClellan et al.
2013/0288539 A1 10/2013 McClellan et al.
2013/0316590 A1 11/2013 Hon
2013/0330941 A1 12/2013 Jeon
2014/0004724 A1 1/2014 Cartier, Jr. et al.
2014/0004726 A1 1/2014 Cartier, Jr. et al.
2014/0004746 A1 1/2014 Cartier, Jr. et al.
2014/0057492 A1 2/2014 Lange et al.
2014/0057493 A1 2/2014 De Geest et al.
2014/0057494 A1 2/2014 Cohen
2014/0057498 A1 2/2014 Cohen
2014/0065883 A1 3/2014 Cohen et al.
2014/0098508 A1 4/2014 Dunham
2014/0148059 A1 5/2014 Long
2014/0248796 A1 9/2014 Pan
2014/0273557 A1 9/2014 Cartier, Jr. et al.
2014/0273627 A1 9/2014 Cartier, Jr. et al.
2014/0287627 A1 9/2014 Cohen
2014/0308852 A1 10/2014 Gulla
2014/0335707 A1 11/2014 Johnescu et al.
2014/0370723 A1 12/2014 Laurx et al.
2015/0056856 A1 2/2015 Atkinson et al.
2015/0111427 A1 4/2015 Wu et al.
2015/0236451 A1 8/2015 Cartier, Jr. et al.
2015/0236452 A1 8/2015 Cartier, Jr. et al.
2015/0255926 A1 9/2015 Paniagua
2015/0280351 A1 10/2015 Bertsch
2016/0141807 A1 5/2016 Gailus et al.
2016/0149343 A1 5/2016 Atkinson et al.
2016/0150633 A1 5/2016 Cartier, Jr.
2016/0150639 A1 5/2016 Gailus et al.
2016/0150645 A1 5/2016 Gailus et al.
2016/0181732 A1 6/2016 Laurx et al.
2016/0315420 A1 10/2016 Horning et al.
2016/0344141 A1 11/2016 Cartier, Jr. et al.
2017/0025783 A1 1/2017 Astbury et al.
2017/0047692 A1 2/2017 Cartier, Jr. et al.
2018/0062323 A1 3/2018 Kirk et al.
2018/0109043 A1 4/2018 Provencher et al.
2018/0145438 A1 5/2018 Cohen
2018/0219331 A1 8/2018 Cartier, Jr. et al.
2018/0233858 A1 8/2018 Cartier, Jr. et al.
2019/0044285 A1 2/2019 Dunham
2019/0109405 A1 4/2019 Astbury et al.
2019/0334292 A1 10/2019 Cartier, Jr. et al.
2020/0021052 A1 1/2020 Milbrand, Jr. et al.
2020/0235529 A1 7/2020 Kirk et al.
2020/0259297 A1 8/2020 Cartier, Jr. et al.
2020/0266585 A1 8/2020 Paniagua et al.
2021/0119371 A1 4/2021 Astbury et al.
2024/0014609 A1 1/2024 Cartier, Jr. et al.

FOREIGN PATENT DOCUMENTS

CN 101395760 A 3/2009
CN 101600293 A 12/2009
CN 101752700 A 6/2010
CN 101790818 A 7/2010
CN 101859946 A 10/2010
CN 101120490 B 11/2010
CN 201846527 U 5/2011
CN 102106041 A 6/2011
CN 102232259 A 11/2011
CN 102239605 A 11/2011
CN 102292881 A 12/2011
CN 202111241 U 1/2012
CN 102356517 A 2/2012
CN 102405564 A 4/2012
CN 101600293 B 5/2012
CN 102570105 A 7/2012
CN 102598430 A 7/2012
CN 102760986 A 10/2012
CN 102859805 A 1/2013
CN 202695788 U 1/2013
CN 102986091 A 3/2013
CN 103151650 A 6/2013
CN 103296510 A 9/2013
CN 104022402 A 9/2014
CN 102138256 B 12/2014
CN 204130744 U 1/2015
CN 102176552 B 2/2015
CN 104425949 A 3/2015
CN 104577398 A 4/2015
CN 104577577 A 4/2015
CN 106099546 A 11/2016
CN 202110866104.0 6/2023
EP 2169770 A2 3/2010
EP 2405537 A1 1/2012
KR 10-2002-0073527 A 9/2002
TW 256397 9/1995
TW 566681 U 12/2003
TW 200644346 A 12/2006
TW 200726013 A 7/2007
TW 200742181 A 11/2007
TW M357771 U 5/2009
TW I319245 B 1/2010
TW M380633 U 5/2010
TW M406821 U 7/2011
TW 201205962 A 2/2012
TW M432178 U 6/2012
TW 201315052 A 4/2013
TW 201334314 A 8/2013
TW 201334317 A 8/2013
TW 201401663 A 1/2014
TW 201524011 A 6/2015
TW I569516 B 2/2017
TW 105123039 2/2020

(56) References Cited

FOREIGN PATENT DOCUMENTS

| | | | |
|---|---|---|---|
| TW | 109137816 | | 9/2021 |
| TW | 110148952 | | 5/2022 |
| WO | WO 2010/030622 | A1 | 3/2010 |
| WO | WO 2010/039188 | A1 | 4/2010 |
| WO | WO 2013/155147 | A1 | 10/2013 |
| WO | PCT/US2016/043358 | | 11/2016 |

OTHER PUBLICATIONS

U.S. Appl. No. 18/316,996, filed May 12, 2023, Cartier et al.
Chinese Notice of Allowance mailed Jun. 6, 2023 in connection with Chinese Application No. 202110866104.0.
International Search Report and Written Opinion mailed Nov. 3, 2016 for Application No. PCT/US2016/043358.
Taiwanese communication for Taiwanese Application No. 105123039 dated Feb. 14, 2020.
Taiwanese Office Action for Taiwanese Application No. 109137816 dated Sep. 24, 2021.
Taiwanese Office Action dated May 2, 2022 in connection with Taiwanese Application No. 110148952.
Cartier et al., Very High Speed, High Density Electrical Interconnection System with Broadside Subassemblies, U.S. Appl. No. 18/316,996, filed May 12, 2023.
Taiwanese Office Action dated Feb. 19, 2024 for Taiwanese Application No. 112102712.

* cited by examiner

EXTENDER MODULE FOR MODULAR CONNECTOR

RELATED APPLICATION

This Application is a Continuation of U.S. application Ser. No. 17/135,753, filed Dec. 28, 2020, entitled "EXTENDER MODULE FOR MODULAR CONNECTOR", which is a Continuation of U.S. application Ser. No. 16/200,372, filed Nov. 26, 2018, entitled "EXTENDER MODULE FOR MODULAR CONNECTOR", which is a Continuation of U.S. application Ser. No. 15/216,254, filed Jul. 21, 2016, entitled "EXTENDER MODULE FOR MODULAR CONNECTOR", which claims the benefit under 35 U.S.C. § 119 (e) to U.S. Provisional Application Ser. No. 62/196,226, filed on Jul. 23, 2015, entitled "EXTENDER MODULE FOR MODULAR CONNECTOR," which is incorporated herein by reference in its entirety for all purposes.

BACKGROUND

This patent application relates generally to interconnection systems, such as those including electrical connectors, used to interconnect electronic assemblies.

Electrical connectors are used in many electronic systems. It is generally easier and more cost effective to manufacture a system as separate electronic assemblies, such as printed circuit boards ("PCBs"), which may be joined together with electrical connectors. A known arrangement for joining several printed circuit boards is to have one printed circuit board serve as a backplane. Other printed circuit boards, called "daughterboards" or "daughtercards," may be connected through the backplane.

A known backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors."

Connectors may also be used in other configurations for interconnecting printed circuit boards. Some systems use a midplane configuration. Similar to a backplane, a midplane has connectors mounted on one surface that are interconnected by conductive traces within the midplane. The midplane additionally has connectors mounted on a second side so that daughter cards are inserted into both sides of the midplane.

The daughter cards inserted from opposite sides of the midplane often have orthogonal orientations. This orientation positions one edge of each printed circuit board adjacent the edge of every board inserted into the opposite side of the midplane. The traces in within the midplane connecting the boards on one side of the miplane to boards on the other side of the midplane can be short, leading to desirable signal integrity properties.

A variation on the midplane configuration is called "direct attach." In this configuration, daughter cards are inserted from opposite sides of the system. These boards likewise are oriented orthogonally so that the edge of a board inserted from one side of the system is adjacent to the edges of the boards inserted from the opposite side of the system. These daughter cards also have connectors. However, rather than plug into connectors on a midplane, the connectors on each daughter card plug directly into connectors on printed circuit boards inserted from the opposite side of the system.

Connectors for this configuration are sometimes called orthogonal connectors. Examples of orthogonal connectors are shown in U.S. Pat. Nos. 7,354,274, 7,331,830, 8,678, 860, 8,057,267 and 8,251,745.

Other connector configurations are also known. For example, a RAM connector is sometimes included a connector product family in which a daughter card connector has a mating interface with receptacles. The RAM connector might have a mating interface with mating contact elements that are complementary to and mate with receptacles. For example, a RAM might have mating interface with pins or blades or other mating contacts that might be used in a backplane connector. A RAM connector might be mounted near an edge of a daughter card and receive a daughter card connector mounted to another daughter card. Alternatively, a cable connector might be plugged into the RAM connector.

SUMMARY

Embodiments of a high speed, high density modular interconnection system are described. In accordance with some embodiments, a connector may be configured for an orthogonal, direct attach configuration through the use of orthogonal extenders. The orthogonal extenders may be captured within a shell of the connector to form an array.

In accordance with some embodiments, an extender module for a connector includes a pair of elongated signal conductors having a first mating end and a second mating end. Each signal conductor of the pair includes a first mating contact portion at the first end and a second mating contact portion at the second end. The first mating contacts of the signal conductors are positioned along a first line and the second mating contacts are positioned along a second line. The first line may be orthogonal to the second line.

In accordance with other embodiments, a connector includes a plurality of connector modules, and each of the plurality of connector modules includes at least one signal conductor, the signal conductor having a contact tail, a mating contact portion and an intermediate portion. The connector includes a support structure holding the plurality of connector modules with the mating contact portions forming an array. The connector further includes a plurality of extender modules, each of the plurality of extender modules having at least one signal conductor, the signal conductor comprising a first mating contact portion, complementary to the mating contact portions of the connector modules, and second mating contact portions. The first mating contact portions engage the mating contact portions of the signal conductors of the plurality of connector modules. A shell engages the plurality of extender modules, and the shell is attached to the support structure and holds the extender modules with the second mating contact portions forming a mating interface.

In accordance with further embodiments, a method of manufacturing an orthogonal connector includes inserting a plurality of connector modules into a housing portion, the connector modules comprising mating contact portions, and the mating contact portions being aligned in a first array in the housing portion. The method further includes inserting first mating contact portions of extender modules into the array of mating contact portions of the connector modules, and attaching a shell over the extender modules, the shell comprising an opening. Attaching the shell retains the extender modules with second mating contact portions in a second array in the opening.

In accordance with some embodiments, a connector includes a housing and a plurality of modules. The plurality of modules include pairs of conductive elements, the conductive elements each having a first end and a second end. The plurality of modules are held within the housing such that the first ends of the conductive elements define a first array and the second ends of the conductive elements define a second array. The modules are configured such that the first ends of the conductive elements of a pair of the modules form a square subarray in the first array, and the second ends of the conductive elements of the pair of the modules forms a square subarray in the second array.

In accordance with other embodiments, an electronic system includes a first printed circuit board comprising a first edge and a second printed circuit board comprising a second edge. The second printed circuit board is orthogonal to the first printed circuit board. The electronic system further includes a first connector mounted at the first edge, and a second connector mounted at the second edge. The first connector and the second connector are configured to mate. The first connector includes a plurality of connector modules, and each connector module comprises at least one signal conductor and shielding. The signal conductors comprise mating contacts, and the connector modules are held with the mating contacts forming a first mating interface. The second connector includes a plurality of connector modules, and each connector modules comprises at least one signal conductor and shielding. The signal conductors comprise mating contacts, and the connector modules are held with the mating contacts forming a second mating interface. At least a portion of the connector modules in the second connector are configured like the connector modules in the first connector. The first connector further comprises a plurality of extender modules, the extender modules each having at least one signal conductor with a first end comprising a first mating contact, and a second end comprising a second mating contact. A shell holds the extender modules within a housing of the first connector such that the first mating contacts mate with the mating contacts of the first mating interface, and the second mating contacts are positioned to mate with mating contacts of the second mating interface.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF PREFERRED EMBODIMENTS

Figure 1:
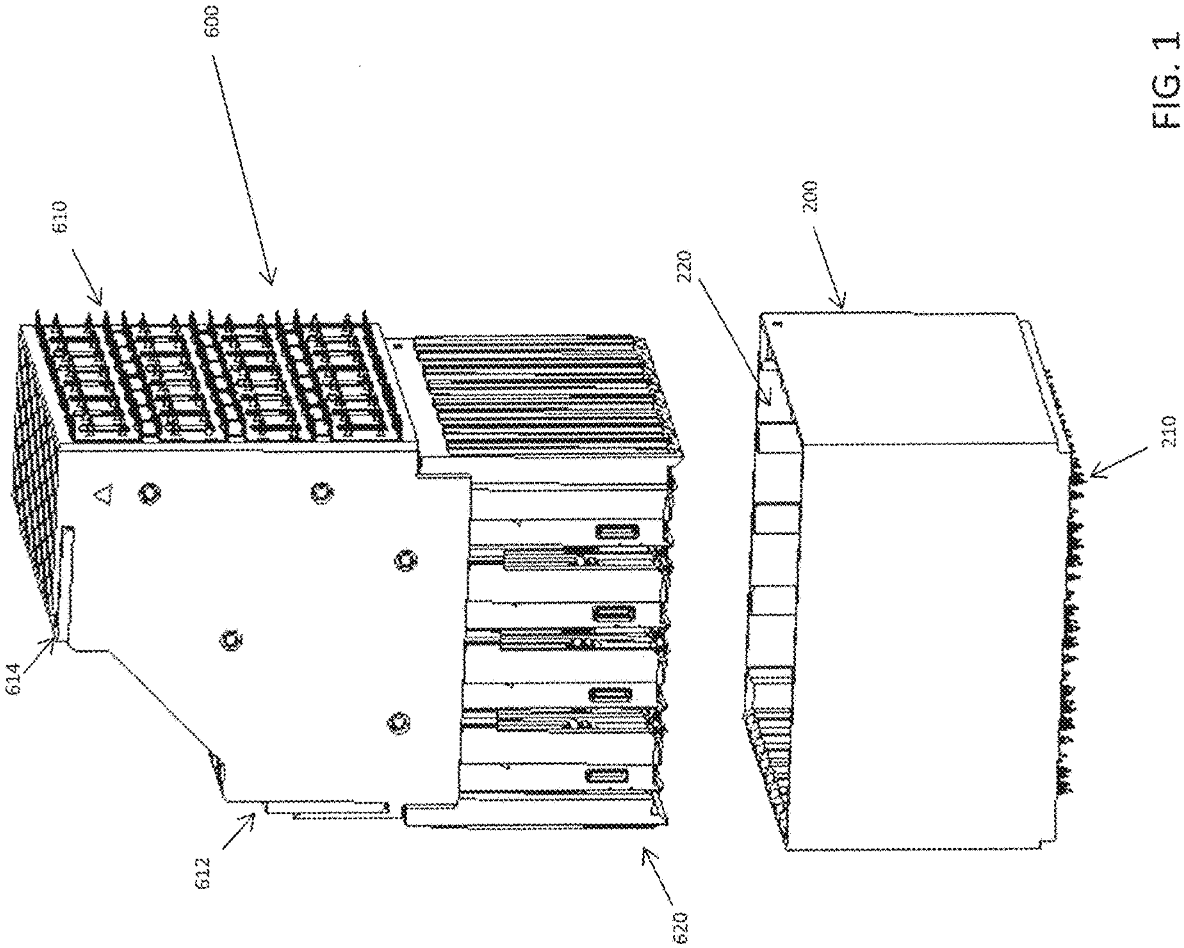
FIG. 1 is an isometric view of an illustrative electrical interconnection system, configured as a right angle backplane connector, in accordance with some embodiments.

The inventors have recognized and appreciated that a high density interconnection system may be simply constructed in a direct attach, orthogonal, RAM or other desired configuration through the use or multiple extender modules. Each extender module may include a signal conducting pair with surrounding shielding. Both ends of the signal conductors of the pair may be terminated with mating contact portions that are adapted to mate with mating contact portions of another connector.

To form an orthogonal connector, the orientation of the signal pair at one of the extender module may be orthogonal to the orientation at the other end of the module. At one end, each of multiple extender modules may be inserted into mating contact portions of connector components that define a first mating interface. The extender modules may be held in place by a shell or other suitable retention structure mechanically coupled to the connector components. The second ends of the extender modules may be held to define a second interface with signal pairs rotated 90 degrees relative to the signal pairs at the first interface. This second interface may mate to another connector. In embodiments in which the extender modules have similar mating contact portions at each end, the second connector may have mating contact portions similar to the mating contact portions of the connector components mated to the first end of the extender modules.

Such a configuration may simplify manufacture of a family of components for an interconnection system that includes direct attach orthogonal components, as well as right angle connectors for use in a backplane or midplane configuration.

In some embodiments, the connectors, whether for use in a backplane or a direct attach orthogonal configuration, may be assembled from multiple connector modules. Each connector module may include a signal conductor pair with surrounding shielding. The signal conductors, at one end, may be configured with contact tails for attachment to a printed circuit board. The other end of the signal conductors may have mating contact portions shaped to mate with complimentary mating contact portions such as terminate the signal conductors within the extender modules. Multiple connector modules may be held in an array by one or more supporting members.

The supporting members may include a front housing portion. When configuring the connector modules to form a daughter card connector, the front housing portion may be configured to mate with a backplane connector. The backplane connector likewise may have multiple signal conductors with mating contact portions. The mating contact portions on the backplane may be complimentary to those on the signal modules that form the daughter card connector, such that, upon mating a daughter card connector and a backplane connector, the signal conductors may mate to form separable signal paths through the interconnection system.

When the connector modules are assembled into an orthogonal connector, a different front housing portion may be used. That front housing portion, like the front housing for a daughter card connector, may hold multiple connector modules to create a mating interface. However, that front housing may be configured to aid in holding extender modules. The extender modules may be inserted into that mating interface. An extender shell may then be installed over the extender modules. The extender shell may mechanically engage the front housing portion holding the connector modules.

In this way, connector modules may be assembled into either a daughter card connector or an orthogonal connector. A relatively small number of components are different between the two connector configurations such that, once tooling is procured to make a daughter card connector, a small amount of additional, relatively simple tooling, is required to create an orthogonal configuration. In the specific embodiment described herein, the additional components to create an orthogonal connector are an extender module, which may have the same configuration for every signal pair in the connector, an extender shell, and a different front housing portion, designed to connect to the extender shell.

In some embodiments, all of the extender modules may have the same shape, regardless of the size of the connector. Each extender module may contain a signal pair and shielding surrounding the signal pair. The signal pair may rotate through 90 degrees within the module such that the signal pair, at a first end of the extender module, is oriented along a first line. At a second end of the extender module, the signal pair may be oriented with the signal pair oriented along a second line, orthogonal to the first line.

The modules may be shaped such that two extender modules may be interlocked to create, at each end, a sub-array of mating contact portions of the signal conductors. The subarray may be square such that rectangular arrays may be built up from multiple pairs of extender modules.

Such a connector configuration may provide desirable signal integrity properties across a frequency range of interest. The frequency range of interest may depend on the operating parameters of the system in which such a connector is used, but may generally have an upper limit between about 15 GHz and 50 GHz, such as 25 GHz, 30 or 40 GHz, although higher frequencies or lower frequencies may be of interest in some applications. Some connector designs may have frequency ranges of interest that span only a portion of this range, such as 1 to 10 GHz or 3 to 15 GHz or 5 to 35 GHz. The impact of unbalanced signal pairs may be more significant at these higher frequencies.

The operating frequency range for an interconnection system may be determined based on the range of frequencies that can pass through the interconnection with acceptable signal integrity. Signal integrity may be measured in terms of a number of criteria that depend on the application for which an interconnection system is designed. Some of these criteria may relate to the propagation of the signal along a single-ended signal path, a differential signal path, a hollow waveguide, or any other type of signal path. Two examples of such criteria are the attenuation of a signal along a signal path or the reflection of a signal from a signal path.

Other criteria may relate to interaction of multiple distinct signal paths. Such criteria may include, for example, near end cross talk, defined as the portion of a signal injected on one signal path at one end of the interconnection system that is measurable at any other signal path on the same end of the interconnection system. Another such criterion may be far end cross talk, defined as the portion of a signal injected on one signal path at one end of the interconnection system that is measurable at any other signal path on the other end of the interconnection system.

As specific examples, it could be required that signal path attenuation be no more than 3 dB power loss, reflected power ratio be no greater than −20 dB, and individual signal path to signal path crosstalk contributions be no greater than −50 dB. Because these characteristics are frequency dependent, the operating range of an interconnection system is defined as the range of frequencies over which the specified criteria are met.

Designs of an electrical connector are described herein that may provide desirable signal integrity for high frequency signals, such as at frequencies in the GHz range, including up to about 25 GHz or up to about 40 GHz or higher, while maintaining high density, such as with a spacing between adjacent mating contacts on the order of 3 mm or less, including center-to-center spacing between adjacent contacts in a column of between 1 mm and 2.5 mm or between 2 mm and 2.5 mm, for example. Spacing between columns of mating contact portions may be similar, although there is no requirement that the spacing between all mating contacts in a connector be the same.

FIG. 1 illustrates an electrical interconnection system of the form that may be used in an electronic system. In this example, the electrical interconnection system includes a right angle connector and may be used, for example, in electrically connecting a daughtercard to a backplane. These figures illustrate two mating connectors. In this example, connector 200 is designed to be attached to a backplane and connector 600 is designed to attach to a daughtercard.

A modular connector, as shown in FIG. 1, may be constructed using any suitable techniques. Additionally, as described herein, the modules used to form connector 600 may be used, in combination with extender modules, to form an orthogonal connector. Such an orthogonal connector may mate with a daughter card connector, such as connector 600.

As can be seen in FIG. 1, daughtercard connector 600 includes contact tails 610 designed to attach to a daughtercard (not shown). Backplane connector 200 includes contact tails 210, designed to attach to a backplane (not shown). These contact tails form one end of conductive elements that pass through the interconnection system. When the connectors are mounted to printed circuit boards, these contact tails will make electrical connection to conductive structures within the printed circuit board that carry signals or are connected to a reference potential. In the example illustrated the contact tails are press fit, "eye of the needle," contacts that are designed to be pressed into vias in a printed circuit board. However, other forms of contact tails may be used.

Each of the connectors also has a mating interface where that connector can mate—or be separated from—the other connector. Daughtercard connector 600 includes a mating interface 620. Backplane connector 200 includes a mating interface 220. Though not fully visible in the view shown in FIG. 1, mating contact portions of the conductive elements are exposed at the mating interface.

Each of these conductive elements includes an intermediate portion that connects a contact tail to a mating contact portion. The intermediate portions may be held within a connector housing, at least a portion of which may be dielectric so as to provide electrical isolation between conductive elements. Additionally, the connector housings may include conductive or lossy portions, which in some embodiments may provide conductive or partially conductive paths between some of the conductive elements. In some embodiments, the conductive portions may provide shielding. The lossy portions may also provide shielding in some instances and/or may provide desirable electrical properties within the connectors.

In various embodiments, dielectric members may be molded or over-molded from a dielectric material such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

All of the above-described materials are suitable for use as binder material in manufacturing connectors. In accordance some embodiments, one or more fillers may be included in some or all of the binder material. As a non-limiting example, thermoplastic PPS filled to 30% by volume with glass fiber may be used to form the entire connector housing or dielectric portions of the housings.

Alternatively or additionally, portions of the housings may be formed of conductive materials, such as machined metal or pressed metal powder. In some embodiments, portions of the housing may be formed of metal or other conductive material with dielectric members spacing signal conductors from the conductive portions. In the embodiment illustrated, for example, a housing of backplane connector 200 may have regions formed of a conductive material with insulative members separating the intermediate portions of signal conductors from the conductive portions of the housing.

The housing of daughtercard connector 600 may also be formed in any suitable way. In the embodiment illustrated, daughtercard connector 600 may be formed from multiple subassemblies, referred to herein as "wafers." Each of the wafers (700, FIG. 7) may include a housing portion, which may similarly include dielectric, lossy and/or conductive portions. One or more members may hold the wafers in a desired position. For example, support members 612 and 614 may hold top and rear portions, respectively, of multiple wafers in a side-by-side configuration. Support members 612 and 614 may be formed of any suitable material, such as a sheet of metal stamped with tabs, openings or other features that engage corresponding features on the individual wafers.

Other members that may form a portion of the connector housing may provide mechanical integrity for daughtercard connector 600 and/or hold the wafers in a desired position. For example, a front housing portion 640 (FIG. 6) may receive portions of the wafers forming the mating interface. Any or all of these portions of the connector housing may be dielectric, lossy and/or conductive, to achieve desired electrical properties for the interconnection system.

In some embodiments, each wafer may hold a column of conductive elements forming signal conductors. These signal conductors may be shaped and spaced to form single ended signal conductors. However, in the embodiment illustrated in FIG. 1, the signal conductors are shaped and spaced in pairs to provide differential signal conductors. Each of the columns may include or be bounded by conductive elements serving as ground conductors. It should be appreciated that ground conductors need not be connected to earth ground, but are shaped to carry reference potentials, which may include earth ground, DC voltages or other suitable reference potentials. The "ground" or "reference" conductors may have a shape different than the signal conductors, which are configured to provide suitable signal transmission properties for high frequency signals.

Conductive elements may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

The spacing between adjacent columns of conductors may be within a range that provides a desirable density and desirable signal integrity. As a non-limiting example, the conductors may be stamped from 0.4 mm thick copper alloy, and the conductors within each column may be spaced apart by 2.25 mm and the columns of conductors may be spaced apart by 2.4 mm. However, a higher density may be achieved by placing the conductors closer together. In other embodiments, for example, smaller dimensions may be used to provide higher density, such as a thickness between 0.2 and 0.4 mm or spacing of 0.7 to 1.85 mm between columns or between conductors within a column. Moreover, each column may include four pairs of signal conductors, such that it density of 60 or more pairs per linear inch is achieved for the interconnection system illustrated in FIG. 1. However, it should be appreciated that more pairs per column, tighter spacing between pairs within the column and/or smaller distances between columns may be used to achieve a higher density connector.

The wafers may be formed in any suitable way. In some embodiments, the wafers may be formed by stamping columns of conductive elements from a sheet of metal and over molding dielectric portions on the intermediate portions of the conductive elements. In other embodiments, wafers may be assembled from modules each of which includes a single, single-ended signal conductor, a single pair of differential signal conductors or any suitable number of single ended or differential pairs.

The inventors have recognized and appreciated that assembling wafers from modules may aid in reducing "skew" in signal pairs at higher frequencies, such as between about 25 GHz and 40 GHz, or higher. Skew, in this context, refers to the difference in electrical propagation time between signals of a pair that operates as a differential signal. Modular construction that reduces skew is designed described, for example in co-pending application 61/930,411, which is incorporated herein by reference.

In accordance with techniques described in that co-pending application, in some embodiments, connectors may be formed of modules, each carrying a signal pair. The modules may be individually shielded, such as by attaching shield members to the modules and/or inserting the modules into an organizer or other structure that may provide electrical shielding between pairs and/or ground structures around the conductive elements carrying signals.

In some embodiments, signal conductor pairs within each module may be broadside coupled over substantial portions of their lengths. Broadside coupling enables the signal conductors in a pair to have the same physical length. To facilitate routing of signal traces within the connector footprint of a printed circuit board to which a connector is attached and/or constructing of mating interfaces of the connectors, the signal conductors may be aligned with edge to edge coupling in one or both of these regions. As a result, the signal conductors may include transition regions in which coupling changes from edge-to-edge to broadside or vice versa. As described below, these transition regions may be designed to prevent mode conversion or suppress undesired propagation modes that can interfere with signal integrity of the interconnection system.

The modules may be assembled into wafers or other connector structures. In some embodiments, a different module may be formed for each row position at which a pair is to be assembled into a right angle connector. These modules may be made to be used together to build up a connector with as many rows as desired. For example, a module of one shape may be formed for a pair to be positioned at the shortest rows of the connector, sometimes called the a-b rows. A separate module may be formed for conductive elements in the next longest rows, sometimes called the c-d rows. The inner portion of the module with the c-d rows may be designed to conform to the outer portion of the module with the a-b rows.

Figure 8:
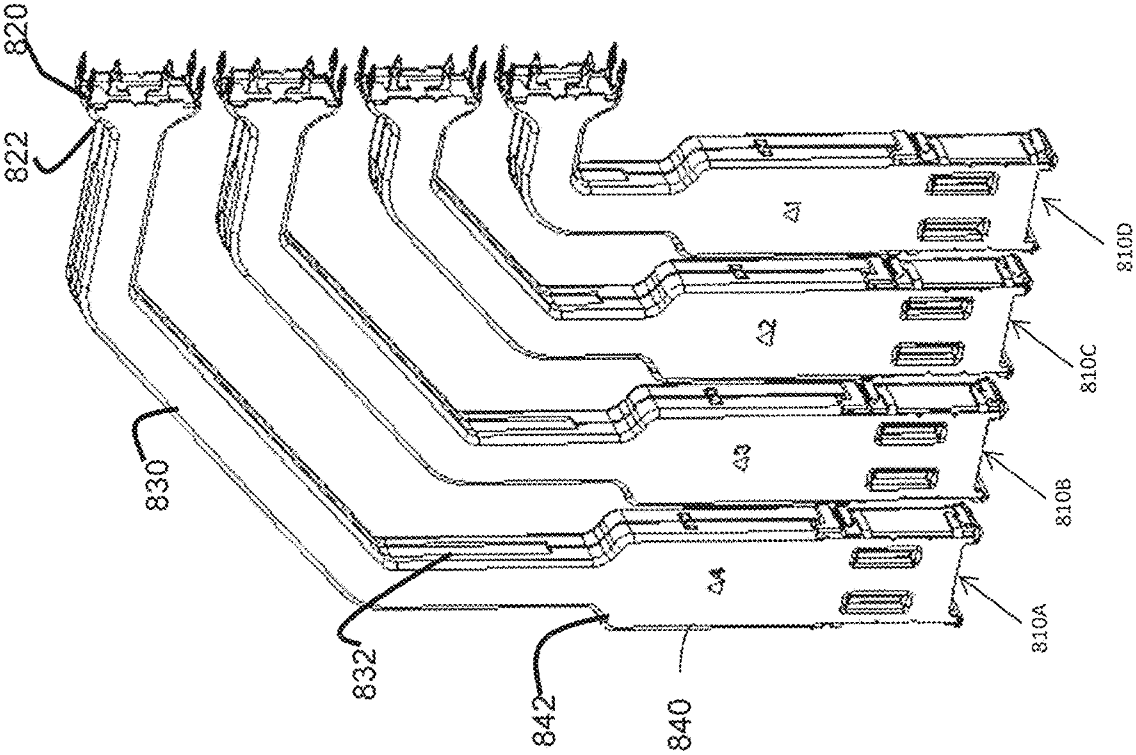
FIG. 8 is an isometric view of wafer modules of the wafer assembly of FIG. 7.

This pattern may be repeated for any number of pairs. Each module may be shaped to be used with modules that carry pairs for shorter and/or longer rows. To make a connector of any suitable size, a connector manufacturer may assemble into a wafer a number of modules to provide a desired number of pairs in the wafer. In this way, a connector manufacturer may introduce a connector family for a widely used connector size—such as 2 pairs. As customer requirements change, the connector manufacturer may procure tools for each additional pair, or, for modules that contain multiple pairs, group of pairs to produce connectors of larger sizes. The tooling used to produce modules for smaller connectors can be used to produce modules for the shorter rows even of the larger connectors. Such a modular connector is illustrated in FIG. 8.

Figure 2:
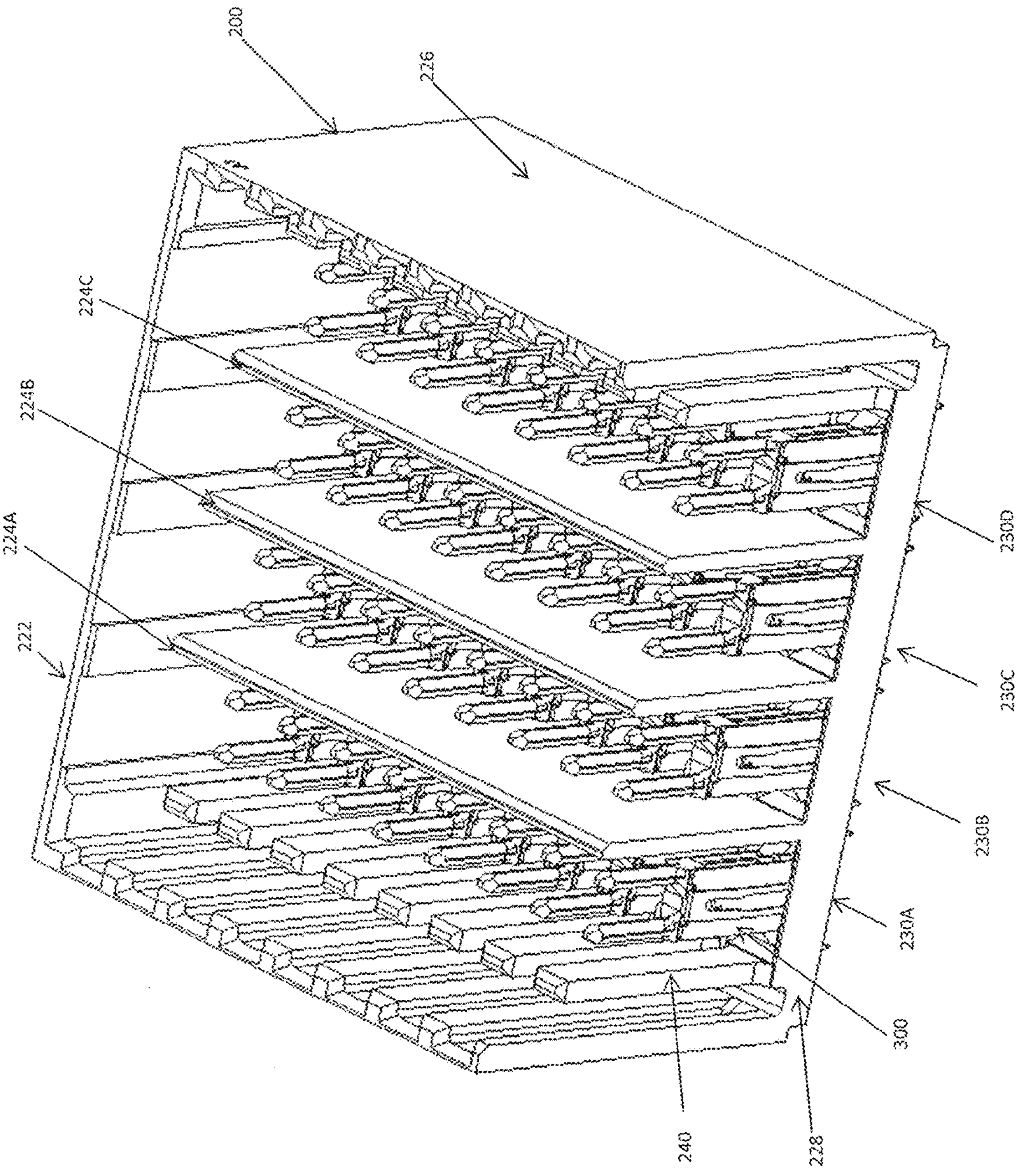
FIG. 2 is an isometric view, partially cutaway, of the backplane connector of FIG. 1.

Further details of the construction of the interconnection system of FIG. 1 are provided in FIG. 2, which shows backplane connector 200 partially cutaway. In the embodiment illustrated in FIG. 2, a forward wall of housing 222 is cut away to reveal the interior portions of mating interface 220.

In the embodiment illustrated, backplane connector 200 also has a modular construction. Multiple pin modules 300 are organized to form an array of conductive elements. Each of the pin modules 300 may be designed to mate with a module of daughtercard connector 600.

In the embodiment illustrated, four rows and eight columns of pin modules 300 are shown. With each pin module having two signal conductors, the four rows 230A, 230B, 230C and 230D of pin modules create columns with four pairs or eight signal conductors, in total. It should be appreciated, however, that the number of signal conductors per row or column is not a limitation of the invention. A greater or lesser number of rows of pin modules may be include within housing 222. Likewise, a greater or lesser number of columns may be included within housing 222. Alternatively or additionally, housing 222 may be regarded as a module of a backplane connector, and multiple such modules may be aligned side to side to extend the length of a backplane connector.

In the embodiment illustrated in FIG. 2, each of the pin modules 300 contains conductive elements serving as signal conductors. Those signal conductors are held within insulative members, which may serve as a portion of the housing of backplane connector 200. The insulative portions of the pin modules 300 may be positioned to separate the signal conductors from other portions of housing 222. In this configuration, other portions of housing 222 may be conductive or partially conductive, such as may result from the use of lossy materials.

In some embodiments, housing 222 may contain both conductive and lossy portions. For example, a shroud including walls 226 and a floor 228 may be pressed from a powdered metal or formed from conductive material in any other suitable way. Pin modules 300 may be inserted into openings within floor 228.

Lossy or conductive members may be positioned adjacent rows 230A, 230B, 230C and 230D of pin modules 300. In the embodiment of FIG. 2, separators 224A, 224B and 224C are shown between adjacent rows of pin modules. Separators 224A, 224B and 224C may be conductive or lossy, and may be formed as part of the same operation or from the same member that forms walls 226 and floor 228. Alternatively, separators 224A, 224B and 224C may be inserted separately into housing 222 after walls 226 and floor 228 are formed. In embodiments in which separators 224A, 224B and 224C formed separately from walls 226 and floor 228 and subsequently inserted into housing 222, separators 224A, 224B and 224C may be formed of a different material than walls 226 and/or floor 228. For example, in some embodiments, walls 226 and floor 228 may be conductive while separators 224A, 224B and 224C may be lossy or partially lossy and partially conductive.

In some embodiments, other lossy or conductive members may extend into mating interface 220, perpendicular to floor 228. Members 240 are shown adjacent to end-most rows 230A and 230D. In contrast to separators 224A, 224B and 224C, which extend across the mating interface 220, separator members 240, approximately the same width as one column, are positioned in rows adjacent row 230A and row 230D. Daughtercard connector 600 may include, in its mating interface 620, slots to receive separators 224A, 224B and 224C. Daughtercard connector 600 may include openings that similarly receive members 240. Members 240 may have a similar electrical effect to separators 224A, 224B and 224C, in that both may suppress resonances, crosstalk or other undesired electrical effects. Members 240, because they fit into smaller openings within daughtercard connector 600 than separators 224A, 224B and 224C, may enable greater mechanical integrity of housing portions of daughtercard connector 600 at the sides where members 240 are received.

Figure 3:
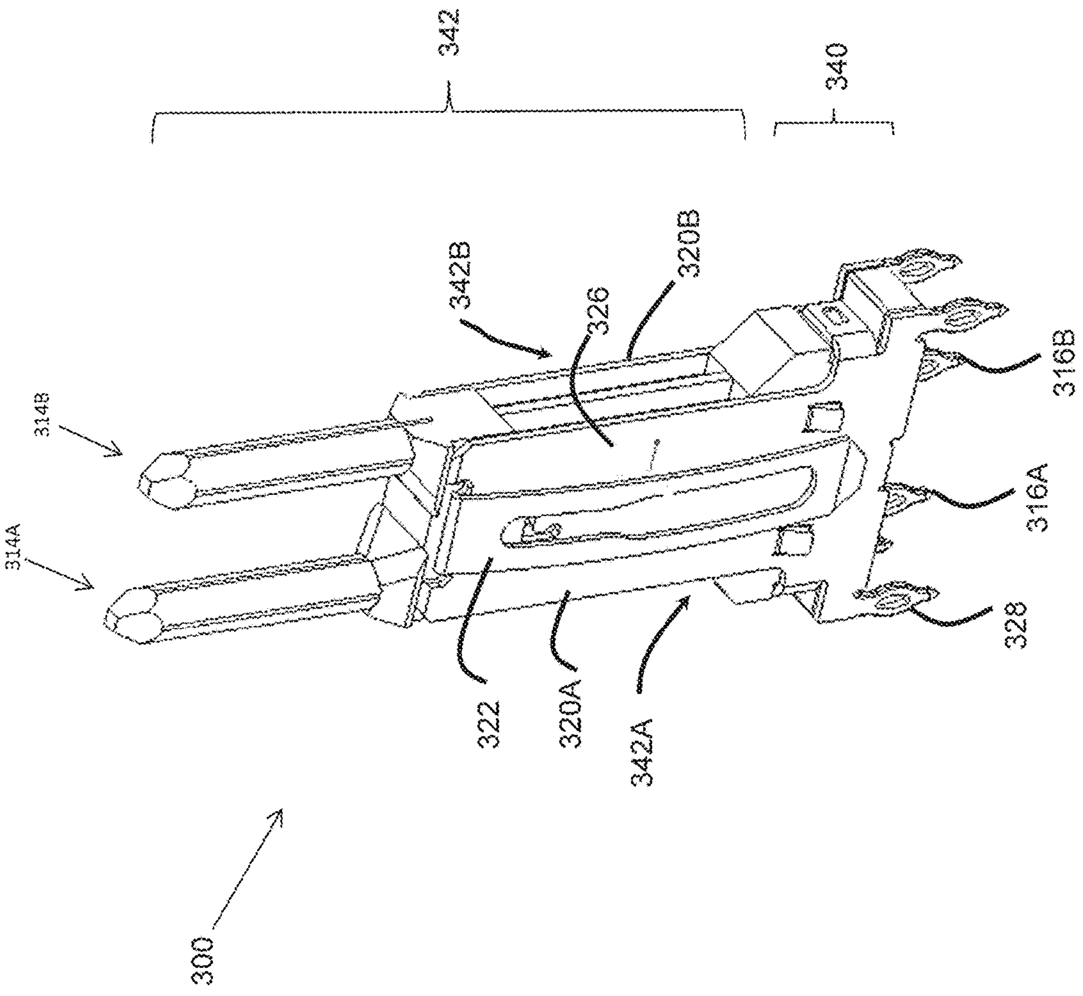
FIG. 3 is an isometric view of a pin assembly of the backplane connector of FIG. 2.

FIG. 3 illustrates a pin module 300 in greater detail. In this embodiment, each pin module includes a pair of conductive elements acting as signal conductors 314A and 314B. Each of the signal conductors has a mating interface portion shaped as a pin. In FIG. 3, that mating interface is on a module configured for use in a backplane connector. However, it should be appreciated that, in embodiments described below, a similar mating interface may be formed at either, or in some embodiments, at both ends of the signal conductors of an extender module.

As shown in FIG. 3, in which that module is configured for use in a backplane connector, opposing ends of the signal conductors have contact tails 316A and 316B. In this embodiment, the contact tails are shaped as press fit compliant sections. Intermediate portions of the signal conductors, connecting the contact tails to the mating contact portions, pass through pin module 300.

Conductive elements serving as reference conductors 320A and 320B are attached at opposing exterior surfaces of pin module 300. Each of the reference conductors has contact tails 328, shaped for making electrical connections to vias within a printed circuit board. The reference conductors also have mating contact portions. In the embodiment illustrated, two types of mating contact portions are illustrated. Compliant member 322 may serve as a mating contact portion, pressing against a reference conductor in daughtercard connector 600. In some embodiments, surfaces 324 and 326 alternatively or additionally may serve as mating contact portions, where reference conductors from the mating conductor may press against reference conductors 320A or 320B. However, in the embodiment illustrated, the reference conductors may be shaped such that electrical contact is made only at compliant member 322.

Figure 4:
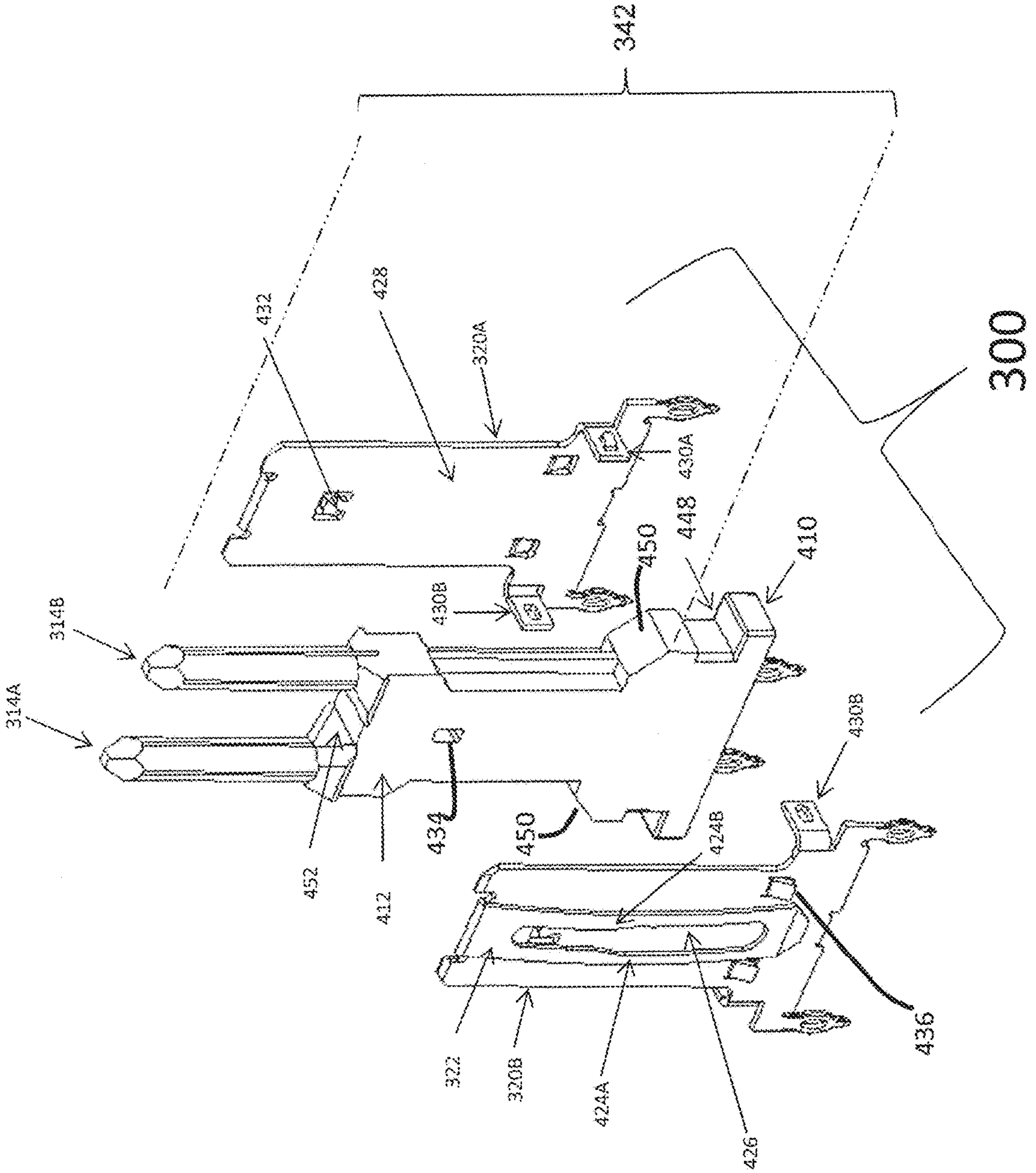
FIG. 4 is an exploded view of the pin assembly of FIG. 3.

FIG. 4 shows an exploded view of pin module 300. Intermediate portions of the signal conductors 314A and 314B are held within an insulative member 410, which may form a portion of the housing of backplane connector 200. Insulative member 410 may be insert molded around signal conductors 314A and 314B. A surface 412 against which reference conductor 320B presses is visible in the exploded view of FIG. 4. Likewise, the surface 428 of reference conductor 320A, which presses against a surface of member 410 not visible in FIG. 4, can also be seen in this view.

As can be seen, the surface 428 is substantially unbroken. Attachment features, such as tab 432 may be formed in the surface 428. Such a tab may engage an opening (not visible in the view shown in FIG. 4) in insulative member 410 to hold reference conductor 320A to insulative member 410. A similar tab (not numbered) may be formed in reference conductor 320B. As shown, these tabs, which serve as attachment mechanisms, are centered between signal conductors 314A and 314B where radiation from or affecting the pair is relatively low. Additionally, tabs, such as 436, may be formed in reference conductors 320A and 320B. Tabs 436 may engage insulative member 410 to hold pin module 300 in an opening in floor 228.

In the embodiment illustrated, compliant member 322 is not cut from the planar portion of the reference conductor 320B that presses against the surface 412 of the insulative member 410. Rather, compliant member 322 is formed from a different portion of a sheet of metal and folded over to be parallel with the planar portion of the reference conductor 320B. In this way, no opening is left in the planar portion of the reference conductor 320B from forming compliant member 322. Moreover, as shown, compliant member 322 has two compliant portions 424A and 424B, which are joined together at their distal ends but separated by an opening 426. This configuration may provide mating contact portions with a suitable mating force in desired locations without leaving an opening in the shielding around pin module 300. However, a similar effect may be achieved in some embodiments by attaching separate compliant members to reference conductors 320A and 320B.

The reference conductors 320A and 320B may be held to pin module 300 in any suitable way. As noted above, tabs 432 may engage an opening 434 in the housing portion. Additionally or alternatively, straps or other features may be used to hold other portions of the reference conductors. As shown, each reference conductor includes straps 430A and 430B. Straps 430A include tabs while straps 430B include openings adapted to receive those tabs. Here reference conductors 320A and 320B have the same shape, and may be made with the same tooling, but are mounted on opposite surfaces of the pin module 300. As a result, a tab 430A of one reference conductor aligns with a tab 430B of the opposing reference conductor such that the tab 430A and the tab 430B interlock and hold the reference conductors in place. These tabs may engage in an opening 448 in the insulative member, which may further aid in holding the reference conductors in a desired orientation relative to signal conductors 314A and 314B in pin module 300.

FIG. 4 further reveals a tapered surface 450 of the insulative member 410. In this embodiment, surface 450 is tapered with respect to the axis of the signal conductor pair formed by signal conductors 314A and 314B. Surface 450 is tapered in the sense that it is closer to the axis of the signal conductor pair closer to the distal ends of the mating contact portions and further from the axis further from the distal ends. In the embodiment illustrated, pin module 300 is symmetrical with respect to the axis of the signal conductor pair and a tapered surface 450 is formed adjacent each of the signal conductors 314A and 314B.

In accordance with some embodiments, some or all of the adjacent surfaces in mating connectors may be tapered. Accordingly, though not shown in FIG. 4, surfaces of the insulative portions of daughtercard connector 600 that are adjacent to tapered surfaces 450 may be tapered in a complementary fashion such that the surfaces from the mating connectors conform to one another when the connectors are in the designed mating positions.

Tapered surfaces in the mating interfaces may avoid abrupt changes in impedance as a function of connector separation. Accordingly, other surfaces designed to be adjacent a mating connector may be similarly tapered. FIG. 4 shows such tapered surfaces 452. As shown, tapered surfaces 452 are between signal conductors 314A and 314B. Surfaces 450 and 452 cooperate to provide a taper on the insulative portions on both sides of the signal conductors.

Figure 5:
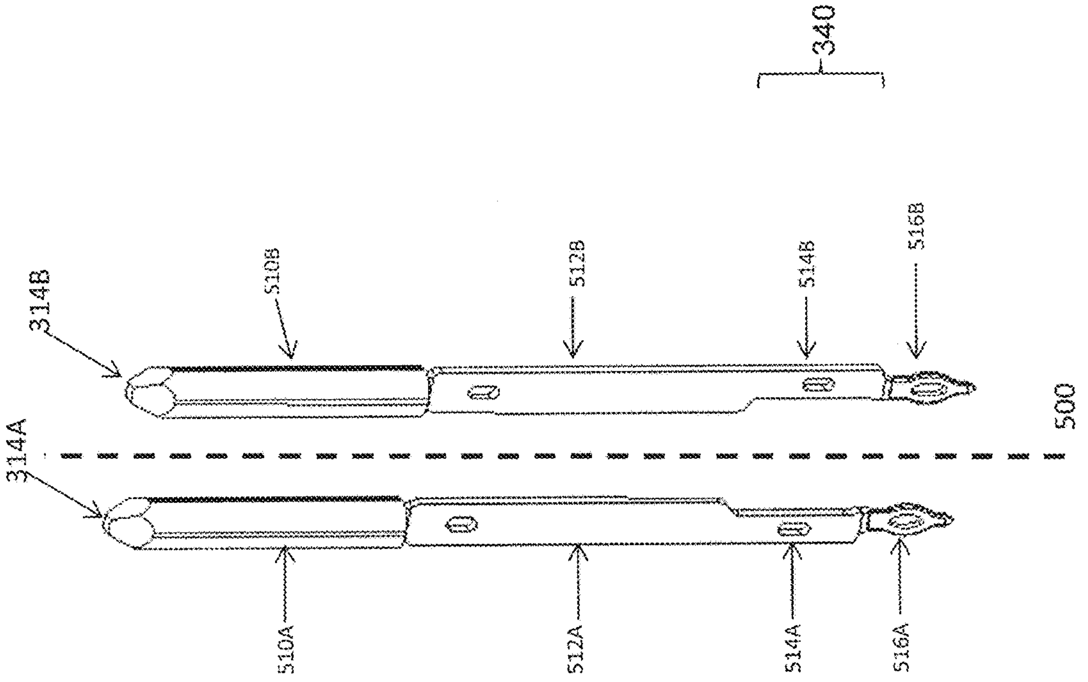
FIG. 5 is an isometric view of signal conductors of the pin assembly of FIG. 3.

FIG. 5 shows further detail of pin module 300. Here, the signal conductors are shown separated from the pin module. FIG. 5 illustrates the signal conductors before being over molded by insulative portions or otherwise being incorporated into a pin module 300. However, in some embodiments, the signal conductors may be held together by a carrier strip or other suitable support mechanism, not shown in FIG. 5, before being assembled into a module.

In the illustrated embodiment, the signal conductors 314A and 314B are symmetrical with respect to an axis 500 of the signal conductor pair. Each has a mating contact portion, 510A or 510B shaped as a pin. Each also has an intermediate portion 512A or 512B, and 514A or 514B. Here, different widths are provided to provide for matching impedance to a mating connector and a printed circuit board, despite different materials or construction techniques in each. A transition region may be included, as illustrated, to provide a gradual transition between regions of different width. Contact tails 516A or 516B may also be included.

In the embodiment illustrated, intermediate portions 512A, 512B, 514A and 514B may be flat, with broadsides and narrower edges. The signal conductors of the pairs are, in the embodiment illustrated, aligned edge-to-edge and are thus configured for edge coupling. In other embodiments, some or all of the signal conductor pairs may alternatively be broadside coupled.

Mating contact portions may be of any suitable shape, but in the embodiment illustrated, they are cylindrical. The cylindrical portions may be formed by rolling portions of a sheet of metal into a tube or in any other suitable way. Such a shape may be created, for example, by stamping a shape from a sheet of metal that includes the intermediate portions. A portion of that material may be rolled into a tube to provide the mating contact portion. Alternatively or additionally, a wire or other cylindrical element may be flattened to form the intermediate portions, leaving the mating contact portions cylindrical. One or more openings (not numbered) may be formed in the signal conductors. Such openings may ensure that the signal conductors are securely engaged with the insulative member 410.

Figure 6:
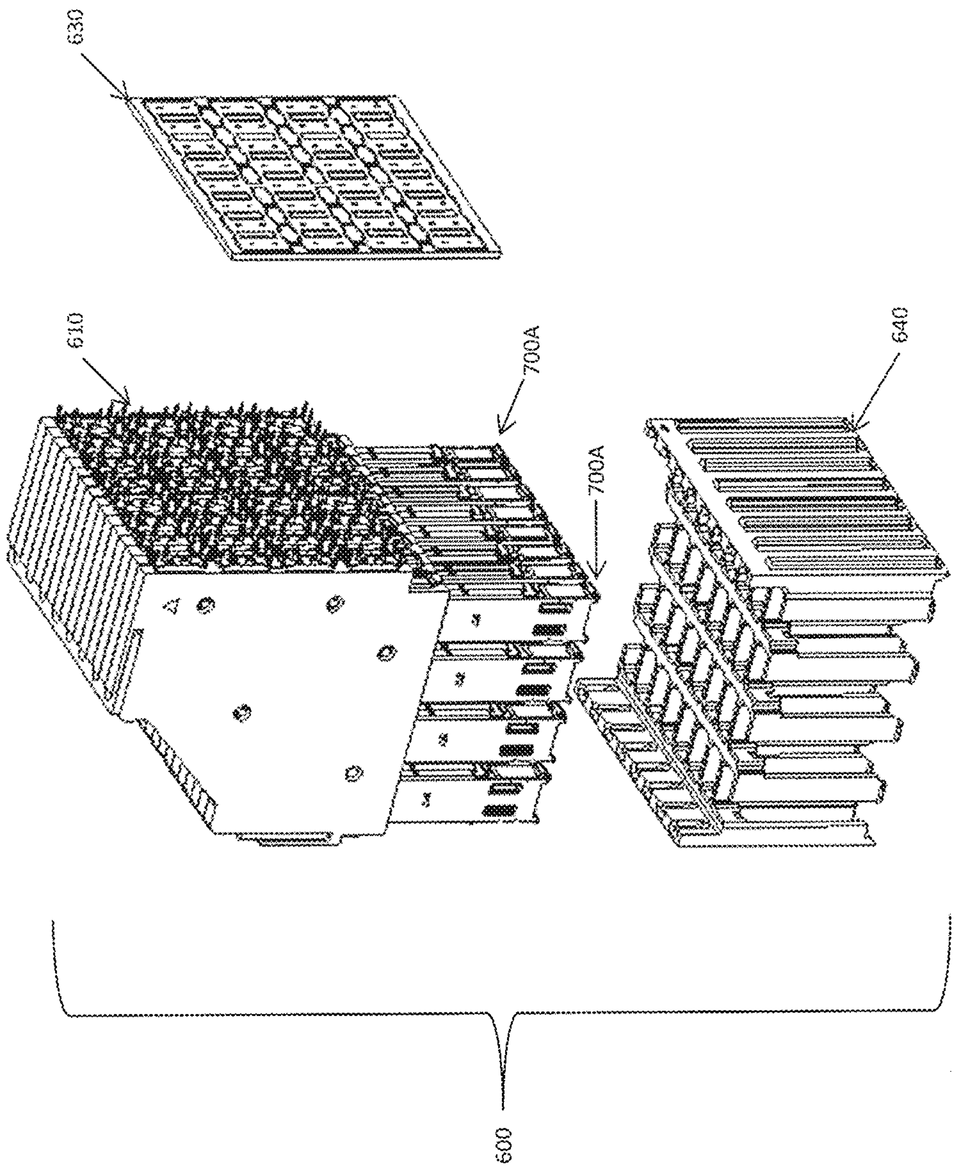
FIG. 6 is an isometric view, partially exploded, of the daughtercard connector of FIG. 1.

Turning to FIG. 6, further details of daughtercard connector 600 are shown in a partially exploded view. Components as illustrated in FIG. 6 may be assembled into a daughtercard connector, configured to mate with backplane connector as described above. Alternatively or additionally, a subset of the connector components shown in FIG. 6 may be, in combination with other components, to form an orthogonal connector. Such an orthogonal connector may mate with a daughtercard connector as shown in FIG. 6.

As shown, connector 600 includes multiple wafers 700A held together in a side-by-side configuration. Here, eight wafers, corresponding to the eight columns of pin modules in backplane connector 200, are shown. However, as with backplane connector 200, the size of the connector assembly may be configured by incorporating more rows per wafer, more wafers per connector or more connectors per interconnection system.

Conductive elements within the wafers 700A may include mating contact portions and contact tails. Contact tails 610 are shown extending from a surface of connector 600 adapted for mounting against a printed circuit board. In some embodiments, contact tails 610 may pass through a member 630. Member 630 may include insulative, lossy or conductive portions. In some embodiments, contact tails associated with signal conductors may pass through insulative portions of member 630. Contact tails associated with reference conductors may pass through lossy or conductive portions.

In some embodiments, the conductive portions may be compliant, such as may result from a conductive elastomer or other material that may be known in the art for forming a gasket. The compliant material may be thicker than the insulative portions of member 630. Such compliant material may be positioned to align with pads on a surface of a daughtercard to which connector 600 is to be attached. Those pads may be connected to reference structures within the printed circuit board such that, when connector 600 is attached to the printed circuit board, the compliant material makes contact with the reference pads on the surface of the printed circuit board.

The conductive or lossy portions of member 630 may be positioned to make electrical connection to reference conductors within connector 600. Such connections may be formed, for example, by contact tails of the reference conductors passing through the lossy of conductive portions. Alternatively or additionally, in embodiments in which the lossy or conductive portions are compliant, those portions may be positioned to press against the mating reference conductors when the connector is attached to a printed circuit board.

Mating contact portions of the wafers 700A are held in a front housing portion 640. The front housing portion may be made of any suitable material, which may be insulative, lossy or conductive or may include any suitable combination or such materials. For example the front housing portion may be molded from a filled, lossy material or may be formed from a conductive material, using materials and techniques similar to those described above for the housing walls 226. As shown, the wafers are assembled from modules 810A, 810B, 810C and 810D (FIG. 8), each with a pair of signal conductors surrounded by reference conductors. In the embodiment illustrated, front housing portion 640 has multiple passages, each positioned to receive one such pair of signal conductors and associated reference conductors. However, it should be appreciated that each module might contain a single signal conductor or more than two signal conductors.

Front housing 640, in the embodiment illustrated, is shaped to fit within walls 226 of a backplane connector 200. However, in some embodiments, as described in more detail below, the front housing may be configured to connect to an extender shell.

Figure 7:
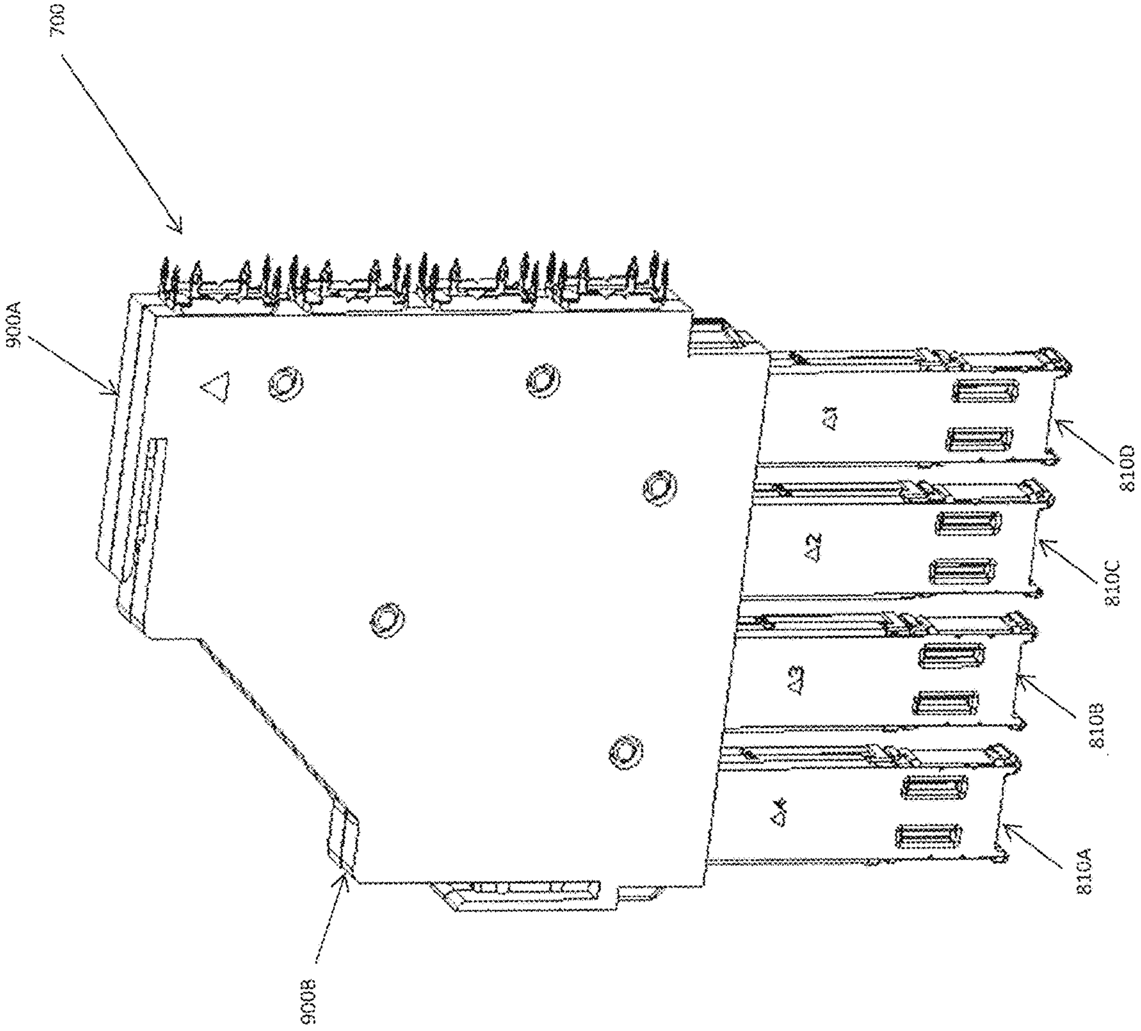
FIG. 7 is an isometric view of a wafer assembly of the daughtercard connector of FIG. 6.

FIG. 7 illustrates a wafer 700. Multiple such wafers may be aligned side-by-side and held together with one or more support members, or in any other suitable way, to form a daughtercard connector or, as described below, an orthogonal connector. In the embodiment illustrated, wafer 700 is formed from multiple modules 810A, 810B, 810C and 810D. The modules are aligned to form a column of mating contact portions along one edge of wafer 700 and a column of contact tails along another edge of wafer 700. In the embodiment in which the wafer is designed for use in a right angle connector, as illustrated, those edges are perpendicular.

In the embodiment illustrated, each of the modules includes reference conductors that at least partially enclose the signal conductors. The reference conductors may similarly have mating contact portions and contact tails.

The modules may be held together in any suitable way. For example, the modules may be held within a housing, which in the embodiment illustrated is formed with members 900A and 900B. Members 900A and 900B may be formed separately and then secured together, capturing modules 810A . . . 810D between them. Members 900A and 900B may be held together in any suitable way, such as by attachment members that form an interference fit or a snap fit. Alternatively or additionally, adhesive, welding or other attachment techniques may be used.

Members 900A and 900B may be formed of any suitable material. That material may be an insulative material. Alternatively or additionally, that material may be or may include portions that are lossy or conductive. Members 900A and 900B may be formed, for example, by molding such materials into a desired shape. Alternatively, members 900A and 900B may be formed in place around modules 810A . . . 810D, such as via an insert molding operation. In such an embodiment, it is not necessary that members 900A and 900B be formed separately. Rather, a housing portion to hold modules 810A . . . 810D may be formed in one operation.

FIG. 8 shows modules 810A . . . 810D without members 900A and 900B. In this view, the reference conductors are visible. Signal conductors (not visible in FIG. 8) are enclosed within the reference conductors, forming a waveguide structure. Each waveguide structure includes a contact tail region 820, an intermediate region 830 and a mating contact region 840. Within the mating contact region 840 and the contact tail region 820, the signal conductors are positioned edge to edge. Within the intermediate region 830, the signal conductors are positioned for broadside coupling. Transition regions 822 and 842 are provided to transition between the edge coupled orientation and the broadside coupled orientation.

The transition regions 822 and 842 in the reference conductors may correspond to transition regions in signal conductors, as described below. In the illustrated embodiment, reference conductors form an enclosure around the signal conductors. A transition region in the reference conductors, in some embodiments, may keep the spacing between the signal conductors and reference conductors generally uniform over the length of the signal conductors. Thus, the enclosure formed by the reference conductors may have different widths in different regions.

The reference conductors provide shielding coverage along the length of the signal conductors. As shown, coverage is provided over substantially all of the length of the signal conductors, including coverage in the mating contact portion and the intermediate portions of the signal conductors. The contact tails are shown exposed so that they can make contact with the printed circuit board. However, in use, these mating contact portions will be adjacent ground structures within a printed circuit board such that being exposed as shown in FIG. 8 does not detract from shielding coverage along substantially all of the length of the signal conductor. In some embodiments, mating contact portions might also be exposed for mating to another connector. Accordingly, in some embodiments, shielding coverage may be provided over more than 80%, 85%, 90% or 95% of the intermediate portion of the signal conductors. Similarly, shielding coverage may also be provided in the transition regions, such that shielding coverage may be provided over more than 80%, 85%, 90% or 95% of the combined length of the intermediate portion and transition regions of the signal conductors. In some embodiments, as illustrated, the mating contact regions and some or all of the contact tails may also be shielded, such that shielding coverage may be, in various embodiments, over more than 80%, 85%, 90% or 95% of the length of the signal conductors.

In the embodiment illustrated, a waveguide-like structure formed by the reference conductors has a wider dimension in the column direction of the connector in the contact tail regions 820 and the mating contact region 840 to accommodate for the wider dimension of the signal conductors being side-by-side in the column direction in these regions. In the embodiment illustrated, contact tail regions 820 and the mating contact region 840 of the signal conductors are separated by a distance that aligns them with the mating contacts of a mating connector or contact structures on a printed circuit board to which the connector is to be attached.

These spacing requirements mean that the waveguide will be wider in the column dimension than it is in the transverse direction, providing an aspect ratio of the waveguide in these regions that may be at least 2:1, and in some embodiments may be on the order of at least 3:1. Conversely, in the intermediate region 830, the signal conductors are oriented with the wide dimension of the signal conductors overlaid in the column dimension, leading to an aspect ratio of the waveguide that may be less than 2:1, and in some embodiments may be less than 1.5:1 or on the order of 1:1.

With this smaller aspect ratio, the largest dimension of the waveguide in the intermediate region 830 will be smaller than the largest dimension of the waveguide in regions 830 and 840. Because that the lowest frequency propagated by a waveguide is inversely proportional to the length of its shortest dimension, the lowest frequency mode of propagation that can be excited in intermediate region 830 is higher than can be excited in contact tail regions 820 and the mating contact region 840. The lowest frequency mode that can be excited in the transition regions will be intermediate between the two. Because the transition from edge coupled to broadside coupling has the potential to excite undesired modes in the waveguides, signal integrity may be improved if these modes are at higher frequencies than the intended operating range of the connector, or at least are as high as possible.

These regions may be configured to avoid mode conversion upon transition between coupling orientations, which would excite propagation of undesired signals through the waveguides. For example, as shown below, the signal conductors may be shaped such that the transition occurs in the intermediate region 830 or the transition regions 822 and 842, or partially within both. Additionally or alternatively, the modules may be structured to suppress undesired modes excited in the waveguide formed by the reference conductors, as described in greater detail below.

Though the reference conductors may substantially enclose each pair, it is not a requirement that the enclosure be without openings. Accordingly, in embodiments shaped to provide rectangular shielding, the reference conductors in the intermediate regions may be aligned with at least portions of all four sides of the signal conductors. The reference conductors may combine for example to provide 360 degree coverage around the pair of signal conductors. Such coverage may be provided, for example, by overlapping or physically contact reference conductors. In the illustrated embodiment, the reference conductors are U-shaped shells and come together to form an enclosure.

Three hundred sixty degree coverage may be provided regardless of the shape of the reference conductors. For example, such coverage may be provided with circular, elliptical or reference conductors of any other suitable shape. However, it is not a requirement that the coverage be complete. The coverage, for example, may have an angular extent in the range between about 270 and 365 degrees. In some embodiments, the coverage may be in the range of about 340 to 360 degrees. Such coverage may be achieved for example, by slots or other openings in the reference conductors.

In some embodiments, the shielding coverage may be different in different regions. In the transition regions, the shielding coverage may be greater than in the intermediate regions. In some embodiments, the shielding coverage may have an angular extent of greater than 355 degrees, or even in some embodiments 360 degrees, resulting from direct contact, or even overlap, in reference conductors in the transition regions even if less shielding coverage is provided in the transition regions.

The inventors have recognized and appreciated that, in some sense, fully enclosing a signal pair in reference conductors in the intermediate regions may create effects that undesirably impact signal integrity, particularly when used in connection with a transition between edge coupling and broadside coupling within a module. The reference conductors surrounding the signal pair may form a waveguide. Signals on the pair, and particularly within a transition region between edge coupling and broadside coupling, may cause energy from the differential mode of propagation between the edges to excite signals that can propagate within the waveguide. In accordance with some embodiments, one or more techniques to avoid exciting these undesired modes, or to suppress them if they are excited, may be used.

Some techniques that may be used to increase the frequency that will excite the undesired modes. In the embodiment illustrated, the reference conductors may be shaped to leave openings 832. These openings may be in the narrower wall of the enclosure. However, in embodiments in which there is a wider wall, the openings may be in the wider wall. In the embodiment illustrated, openings 832 run parallel to the intermediate portions of the signal conductors and are between the signal conductors that form a pair. These slots lower the angular extent of the shielding, such that, adjacent the broadside coupled intermediate portions of the signal conductors, the angular extent of the shielding may be less than 360 degrees. It may, for example, be in the range of 355 of less. In embodiments in which members 900A and 900B are formed by over molding lossy material on the modules, lossy material may be allowed to fill openings 832, with or without extending into the inside of the waveguide, which may suppress propagation of undesired modes of signal propagation, that can decrease signal integrity.

In the embodiment illustrated in FIG. 8, openings 832 are slot shaped, effectively dividing the shielding in half in intermediate region 830. The lowest frequency that can be excited in a structure serving as a waveguide—as is the effect of the reference conductors that substantially surround the signal conductors as illustrated in FIG. 8—is inversely proportional to the dimensions of the sides. In some embodiments, the lowest frequency waveguide mode that can be excited is a TEM mode. Effectively shortening a side by incorporating slot-shaped opening 832, raises the frequency of the TEM mode that can be excited. A higher resonant frequency can mean that less energy within the operating frequency range of the connector is coupled into undesired propagation within the waveguide formed by the reference conductors, which improves signal integrity.

In region 830, the signal conductors of a pair are broadside coupled and the openings 832, with or without lossy material in them, may suppress TEM common modes of propagation. While not being bound by any particular theory of operation, the inventors theorize that openings 832, in combination with an edge coupled to broadside coupled transition, aids in providing a balanced connector suitable for high frequency operation.

Figure 9:
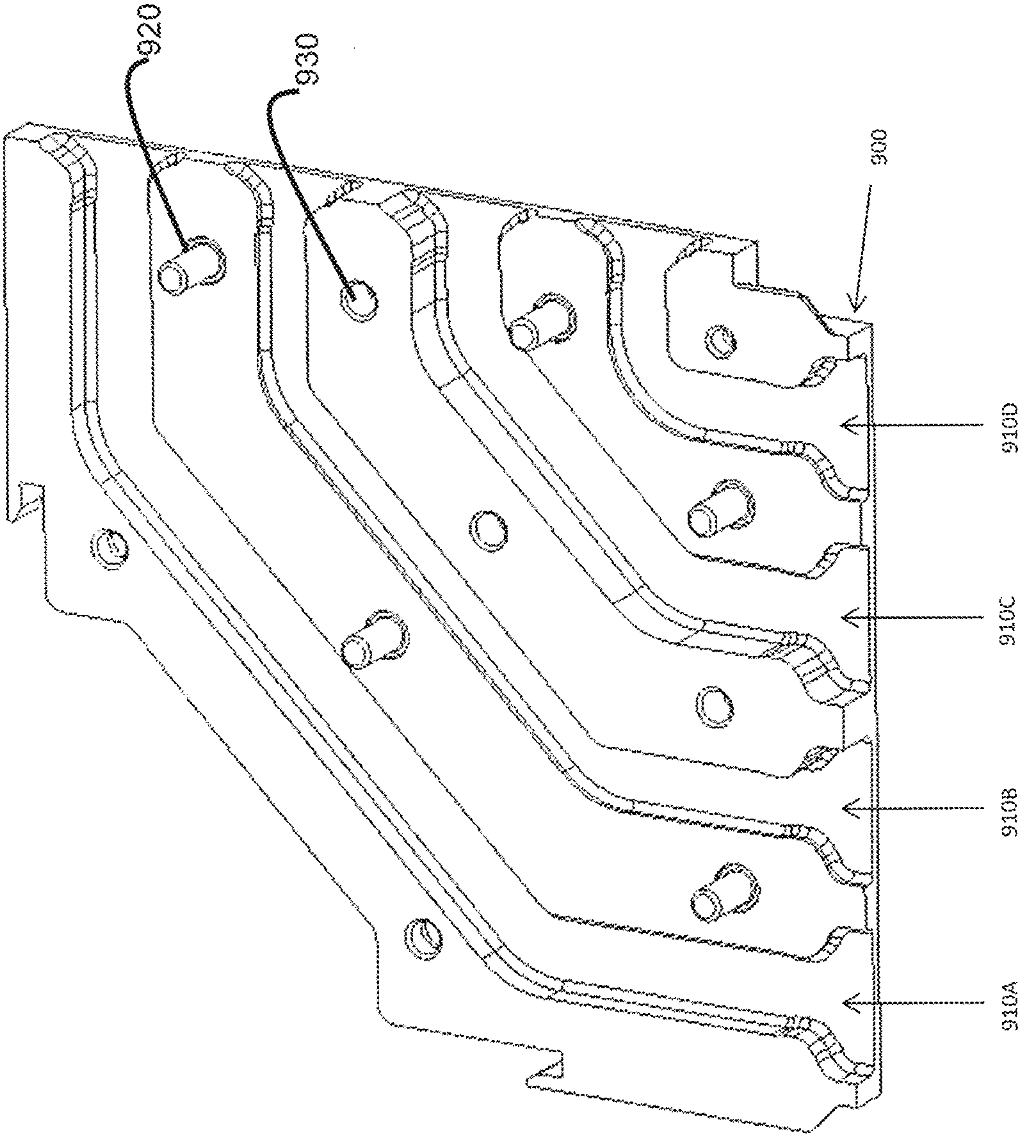
FIG. 9 is an isometric view of a portion of the insulative housing of the wafer assembly of FIG. 7.

FIG. 9 illustrates a member 900, which may be a representation of member 900A or 900B. As can be seen, member 900 is formed with channels 910A . . . 910D shaped to receive modules 810A . . . 810D shown in FIG. 8. With the modules in the channels, member 900A may be secured to member 900B. In the illustrated embodiment, attachment of members 900A and 900B may be achieved by posts, such as post 920, in one member, passing through a hole, such as hole 930, in the other member. The post may be welded or otherwise secured in the hole. However, any suitable attachment mechanism may be used.

Members 900A and 900B may be molded from or include a lossy material. Any suitable lossy material may be used for these and other structures that are "lossy." Materials that conduct, but with some loss, or material which by another physical mechanism absorbs electromagnetic energy over the frequency range of interest are referred to herein generally as "lossy" materials. Electrically lossy materials can be formed from lossy dielectric and/or poorly conductive and/or lossy magnetic materials. Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest. Electrically lossy material can be formed from material traditionally regarded as dielectric materials, such as those that have an electric loss tangent greater than approximately 0.05 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 siemen/meter to about 100,000 siemens/meter and preferably about 1 siemen/meter to about 10,000 siemens/meter. In some embodiments material with a bulk conductivity of between about 10 siemens/meter and about 200 siemens/meter may be used. As a specific example, material with a conductivity of about 50 siemens/meter may be used. However, it should be appreciated that the conductivity of the material may be selected empirically or through electrical simulation using known simulation tools to determine a suitable conductivity that provides both a suitably low crosstalk with a suitably low signal path attenuation or insertion loss.

Electrically lossy materials may be partially conductive materials, such as those that have a surface resistivity between 1 Ω/square and 100,000 Ω/square. In some embodiments, the electrically lossy material has a surface resistivity between 10 Ω/square and 1000 Ω/square. As a specific example, the material may have a surface resistivity of between about 20 Ω/square and 80 Ω/square.

In some embodiments, electrically lossy material is formed by adding to a binder a filler that contains conductive particles. In such an embodiment, a lossy member may be formed by molding or otherwise shaping the binder with filler into a desired form. Examples of conductive particles that may be used as a filler to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the invention is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Celanese Corporation which can be filled with carbon fibers or stainless steel filaments. A lossy material, such as lossy conductive carbon filled adhesive preform, such as those sold by Techfilm of Billerica, Massachusetts, US may also be used. This preform can include an epoxy binder filled with carbon fibers and/or other carbon particles. The binder surrounds carbon particles, which act as a reinforcement for the preform. Such a preform may be inserted in a connector wafer to form all or part of the housing. In some embodiments, the preform may adhere through the adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present invention is not limited in this respect.

In some embodiments, a lossy member may be manufactured by stamping a preform or sheet of lossy material. For example, an insert may be formed by stamping a preform as described above with an appropriate pattern of openings. However, other materials may be used instead of or in addition to such a preform. A sheet of ferromagnetic material, for example, may be used.

However, lossy members also may be formed in other ways. In some embodiments, a lossy member may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together.

Figure 10:
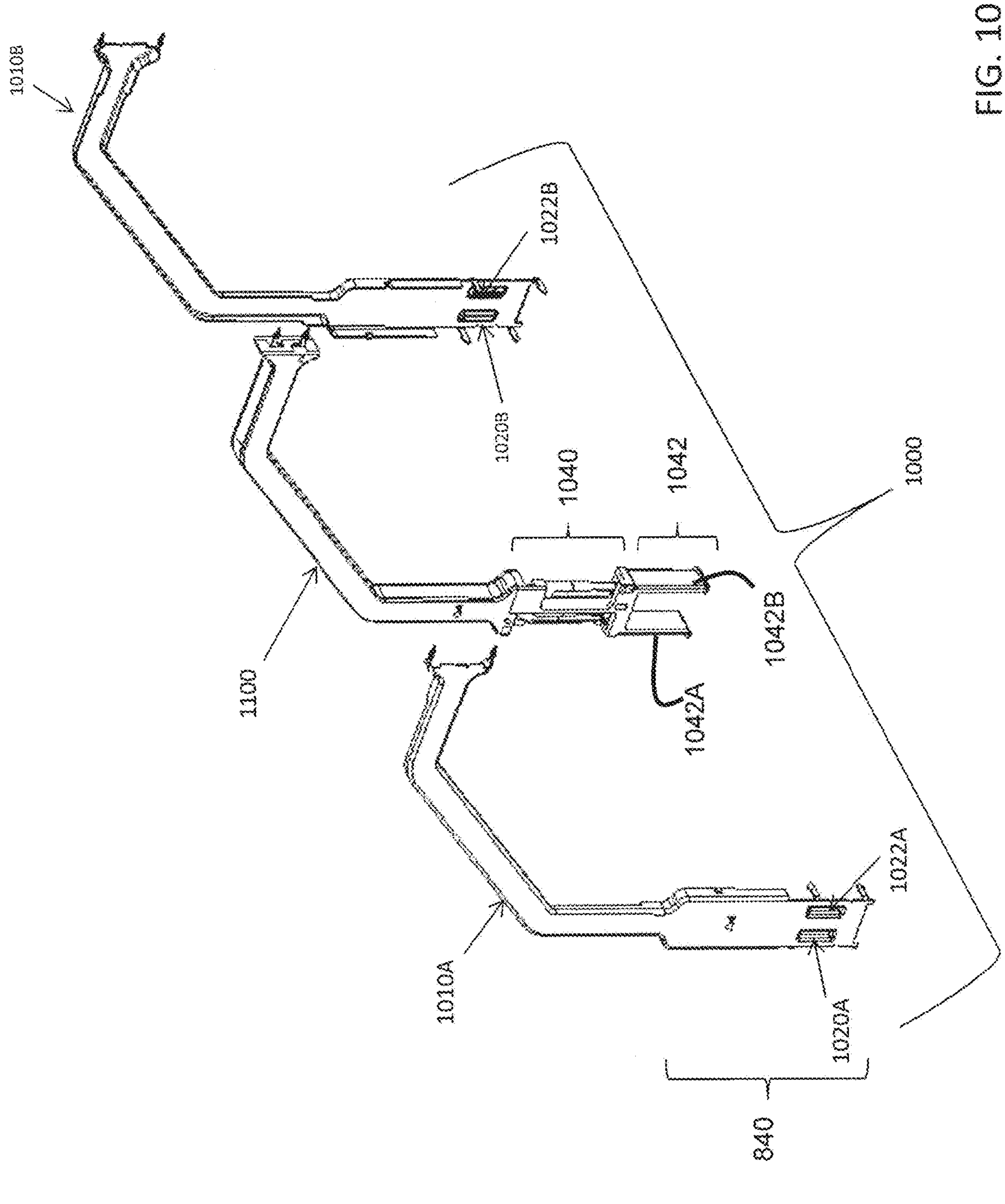
FIG. 10 is an isometric view, partially exploded, of a wafer module of the wafer assembly of FIG. 7.

FIG. 10 shows further details of construction of a wafer module 1000. Module 1000 may be representative of any of the modules in a connector, such as any of the modules 810A . . . 810D shown in FIGS. 7-8. Each of the modules 810A . . . 810D may have the same general construction, and some portions may be the same for all modules. For example, the contact tail regions 820 and mating contact regions 840 may be the same for all modules. Each module may include an intermediate portion region 830, but the length and shape of the intermediate portion region 830 may vary depending on the location of the module within the wafer.

In the embodiment illustrated, module 100 includes a pair of signal conductors 1310A and 1310B (FIG. 13) held within an insulative housing portion 1100. Insulative housing portion 1100 is enclosed, at least partially, by reference conductors 1010A and 1010B. This subassembly may be held together in any suitable way. For example, reference conductors 1010A and 1010B may have features that engage one another. Alternatively or additionally, reference conductors 1010A and 1010B may have features that engage insulative housing portion 1100. As yet another example, the reference conductors may be held in place once members 900A and 900B are secured together as shown in FIG. 7.

The exploded view of FIG. 10 reveals that mating contact region 840 includes subregions 1040 and 1042. Subregion 1040 includes mating contact portions of module 1000. When mated with a pin module 300, mating contact portions from the pin module will enter subregion 1040 and engage the mating contact portions of module 1000. These components may be dimensioned to support a "functional mating range," such that, if the module 300 and module 1000 are fully pressed together, the mating contact portions of module 1000 will slide along the pins from pin module 300 by the "functional mating range" distance during mating.

The impedance of the signal conductors in subregion 1040 will be largely defined by the structure of module 1000. The separation of signal conductors of the pair as well as the separation of the signal conductors from reference conductors 1010A and 1010B will set the impedance. The dielectric constant of the material surrounding the signal conductors, which in this embodiment is air, will also impact the impedance. In accordance with some embodiments, design parameters of module 1000 may be selected to provide a nominal impedance within region 1040. That impedance may be designed to match the impedance of other portions of module 1000, which in turn may be selected to match the impedance of a printed circuit board or other portions of the interconnection system such that the connector does not create impedance discontinuities.

If the modules 300 and 1000 are in their nominal mating position, which in this embodiment is fully pressed together, the pins will be within mating contact portions of the signal conductors of module 1000. The impedance of the signal conductors in subregion 1040 will still be driven largely by the configuration of subregion 1040, providing a matched impedance to the rest of module 1000.

A subregion 340 (FIG. 3) may exist within pin module 300. In subregion 340, the impedance of the signal conductors will be dictated by the construction of pin module 300. The impedance will be determined by the separation of signal conductors 314A and 314B as well as their separation from reference conductors 320A and 320B. The dielectric constant of insulative portion 410 may also impact the impedance. Accordingly, these parameters may be selected to provide, within subregion 340, an impedance, which may be designed to match the nominal impedance in subregion 1040.

The impedance in subregions 340 and 1040, being dictated by construction of the modules, is largely independent of any separation between the modules during mating. However, modules 300 and 1000 have, respectively, subregions 342 and 1042 that interact with components from the mating module that could influence impedance. Because the positioning of these components could influence impedance, the impedance could vary as a function of separation of the mating modules. In some embodiments, these components are positioned to reduce changes of impedance, regardless of separation distance, or to reduce the impact of changes of impedance by distributing the change across the mating region.

When pin module 300 is pressed fully against module 1000, the components in subregions 342 and 1042 may combine to provide the nominal mating impedance. Because the modules are designed to provide functional mating range, signal conductors within pin module 300 and module 1000 may mate, even if those modules are separated by an amount that equals the functional mating range, such that separation between the modules can lead to changes in impedance, relative to the nominal value, at one or more places along the signal conductors in the mating region. Appropriate shape and positioning of these members can reduce that change or reduce the effect of the change by distributing it over portions of the mating region.

In the embodiments illustrated in FIG. 3 and FIG. 10, subregion 1042 is designed to overlap pin module 300 when module 1000 is pressed fully against pin module 300. Projecting insulative members 1042A and 1042B are sized to fit within spaces 342A and 342B, respectively. With the modules pressed together, the distal ends of insulative members 1042A and 1042B press against surfaces 450 (FIG. 4). Those distal ends may have a shape complementary to the taper of surfaces 450 such that insulative members 1042A and 1042B fill spaces 342A and 342B, respectively. That overlap creates a relative position of signal conductors, dielectric, and reference conductors that may approximate the structure within subregion 340. These components may be sized to provide the same impedance as in subregion 340 when modules 300 and 1000 are fully pressed together. When the modules are fully pressed together, which in this example is the nominal mating position, the signal conductors will have the same impedance across the mating region made up by subregions 340, 1040 and where subregions 342 and 1042 overlap.

These components also may be sized and may have material properties that provide impedance control as a function of separation of modules 300 and 1000. Impedance control may be achieved by providing approximately the same impedance through subregions 342 and 1042, even if those subregions do not fully overlap, or by providing gradual impedance transitions, regardless of separation of the modules.

In the illustrated embodiment, this impedance control is provided in part by projecting insulative members 1042A and 1042B, which fully or partially overlap module 300, depending on separation between modules 300 and 1000. These projecting insulative members can reduce the magnitude of changes in relative dielectric constant of material surrounding pins from pin module 300. Impedance control is also provided by projections 1020A and 1022A and 1020B and 1022B in the reference conductors 1010A and 1010B. These projections impact the separation, in a direction perpendicular to the axis of the signal conductor pair, between portions of the signal conductor pair and the reference conductors 1010A and 1010B. This separation, in combination with other characteristics, such as the width of the signal conductors in those portions, may control the impedance in those portions such that it approximates the nominal impedance of the connector or does not change abruptly in a way that may cause signal reflections. Other parameters of either or both mating modules may be configured for such impedance control.

Figure 11:
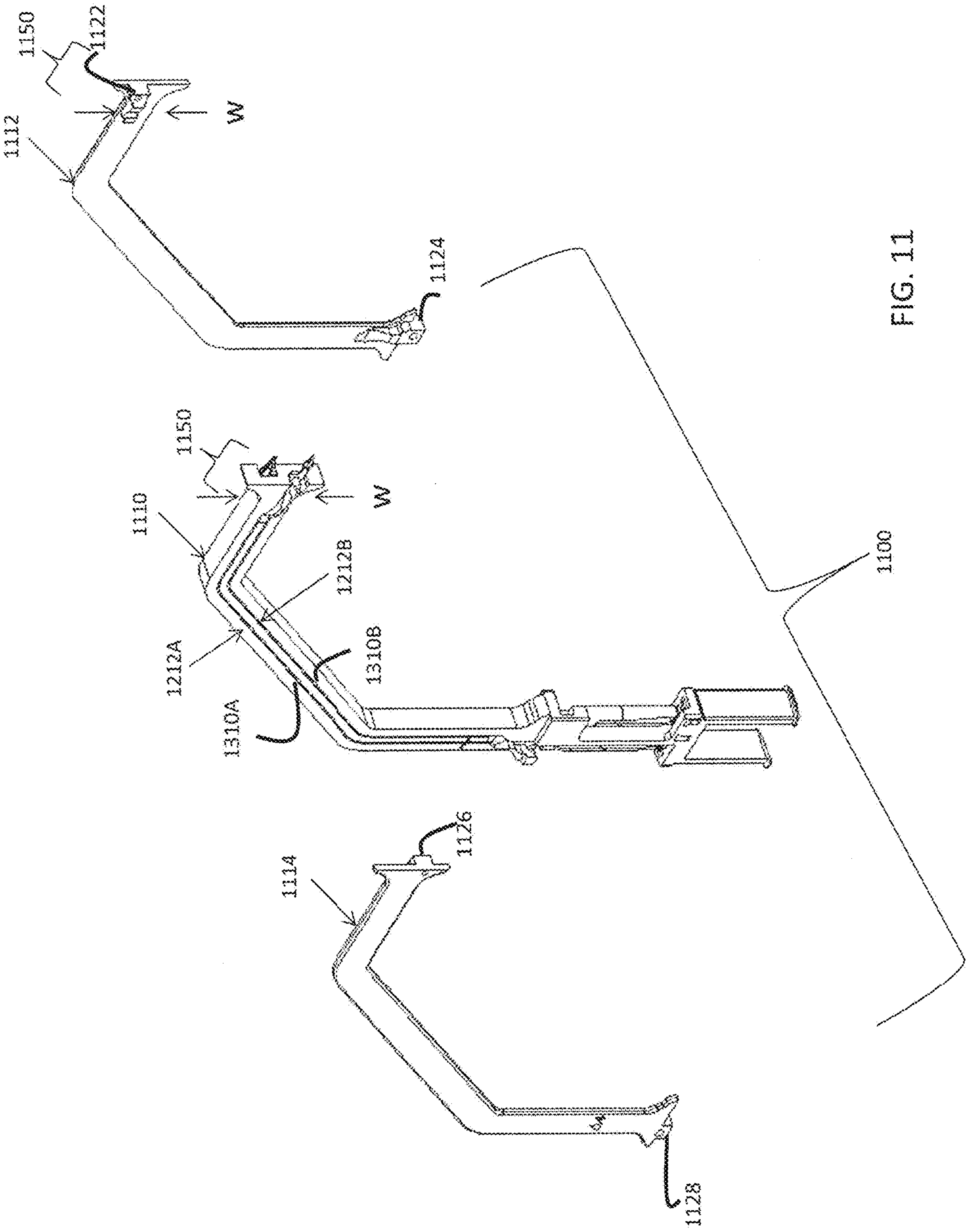
FIG. 11 is an isometric view, partially exploded, of a portion of a wafer module of the wafer assembly of FIG. 7.

Turning to FIG. 11, further details of exemplary components of a module 1000 are illustrated. FIG. 11 is an exploded view of module 1000, without reference conductors 1010A and 1010B shown. Insulative housing portion 1100 is, in the illustrated embodiment, made of multiple components. Central member 1110 may be molded from insulative material. Central member 1110 includes two grooves 1212A and 1212B into which conductive elements 1310A and 1310B, which in the illustrated embodiment form a pair of signal conductors, may be inserted.

Covers 1112 and 1114 may be attached to opposing sides of central member 1110. Covers 1112 and 1114 may aid in holding conductive elements 1310A and 1310B within grooves 1212A and 1212B and with a controlled separation from reference conductors 1010A and 1010B. In the embodiment illustrated, covers 1112 and 1114 may be formed of the same material as central member 1110. However, it is not a requirement that the materials be the same, and in some embodiments, different materials may be used, such as to provide different relative dielectric constants in different regions to provide a desired impedance of the signal conductors.

In the embodiment illustrated, grooves 1212A and 1212B are configured to hold a pair of signal conductors for edge coupling at the contact tails and mating contact portions. Over a substantial portion of the intermediate portions of the signal conductors, the pair is held for broadside coupling. To transition between edge coupling at the ends of the signal conductors to broadside coupling in the intermediate portions, a transition region may be included in the signal conductors. Grooves in central member 1110 may be shaped to provide the transition region in the signal conductors. Projections 1122, 1124, 1126 and 1128 on covers 1112 and 1114 may press the conductive elements against central portion 1110 in these transition regions.

In the embodiment illustrated in FIG. 11, it can be seen that the transition between broadside and edge coupling occurs over a region 1150. At one end of this region, the signal conductors are aligned edge-to-edge in the column direction in a plane parallel to the column direction. Traversing region 1150 in towards the intermediate portion, the signal conductors jog in opposition direction perpendicular to that plane and jog towards each other. As a result, at the end of region 1150, the signal conductors are in separate planes parallel to the column direction. The intermediate portions of the signal conductors are aligned in a direction perpendicular to those planes.

Region 1150 includes the transition region, such as 822 or 842 where the waveguide formed by the reference conductor transitions from its widest dimension to the narrower dimension of the intermediate portion, plus a portion of the narrower intermediate region 830. As a result, at least a portion of the waveguide formed by the reference conductors in this region 1150 has a widest dimension of W, the same as in the intermediate region 830. Having at least a portion of the physical transition in a narrower part of the waveguide reduces undesired coupling of energy into waveguide modes of propagation.

Having full 360 degree shielding of the signal conductors in region 1150 may also reduce coupling of energy into undesired waveguide modes of propagation. Accordingly, openings 832 do not extend into region 1150 in the embodiment illustrated.

Figure 12:
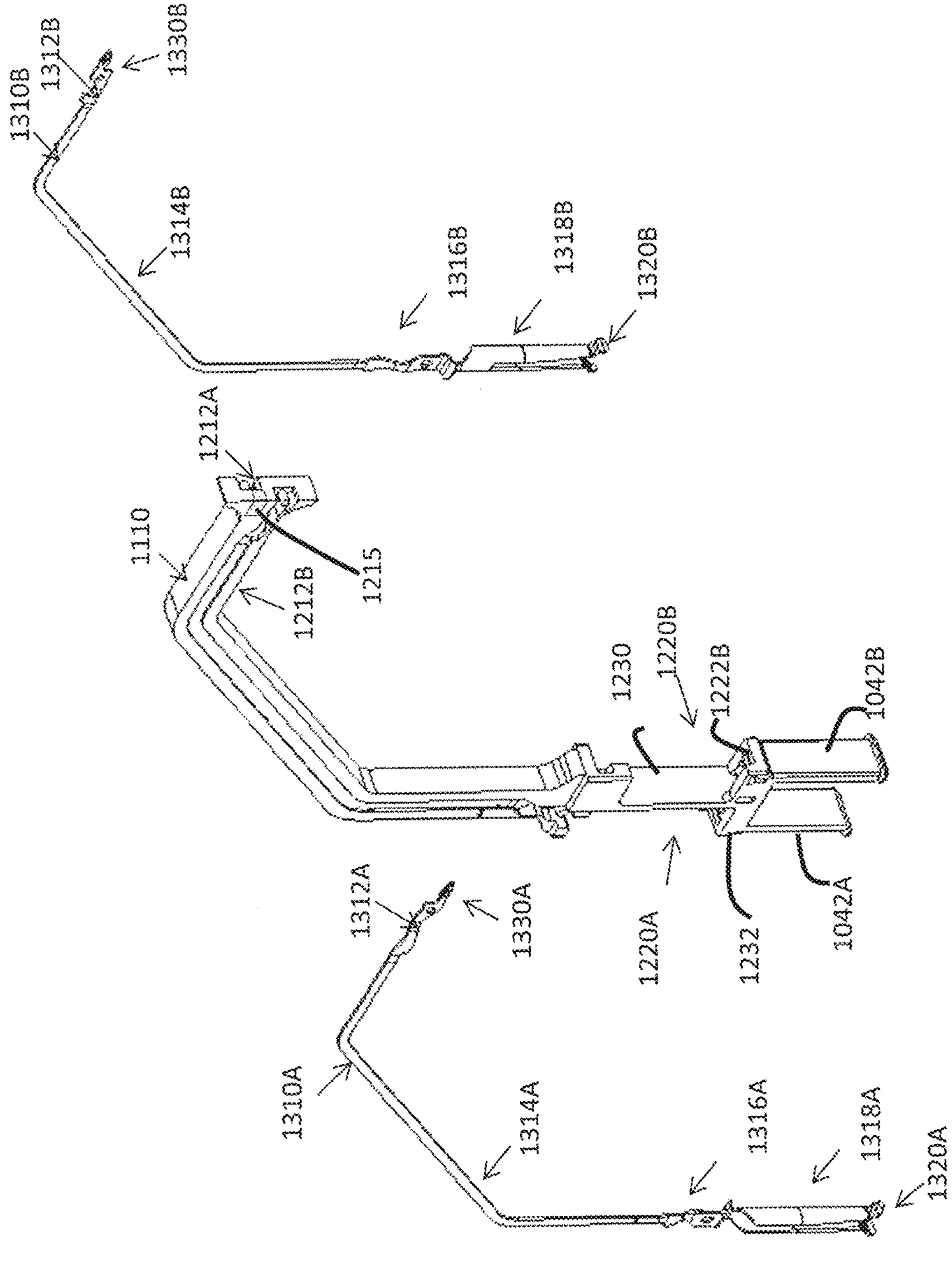
FIG. 12 is an isometric view, partially exploded, of a portion of a wafer module of the wafer assembly of FIG. 7.

FIG. 12 shows further detail of a module 1000. In this view, conductive elements 1310A and 1310B are shown separated from central member 1110. For clarity, covers 1112 and 1114 are not shown. Transition region 1312A between contact tail 1330A and intermediate portion 1314A is visible in this view. Similarly, transition region 1316A between intermediate portion 1314A and mating contact portion 1318A is also visible. Similar transition regions 1312 B and 1316B are visible for conductive element 1310B, allowing for edge coupling at contact tails 1330B and mating contact portions 1318B and broadside coupling at intermediate portion 1314B.

The mating contact portions 1318A and 1318 B may be formed from the same sheet of metal as the conductive elements. However, it should be appreciated that, in some embodiments, conductive elements may be formed by attaching separate mating contact portions to other conductors to form the intermediate portions. For example, in some embodiments, intermediate portions may be cables such that the conductive elements are formed by terminating the cables with mating contact portions.

In the embodiment illustrated, the mating contact portions are tubular. Such a shape may be formed by stamping the conductive element from a sheet of metal and then forming to roll the mating contact portions into a tubular shape. The circumference of the tube may be large enough to accommodate a pin from a mating pin module, but may conform to the pin. The tube may be split into two or more segments, forming compliant beams. Two such beams are shown in FIG. 12. Bumps or other projections may be formed in distal portions of the beams, creating contact surfaces. Those contact surfaces may be coated with gold or other conductive, ductile material to enhance reliability of an electrical contact.

When conductive elements 1310A and 1310B are mounted in central member 1110, mating contact portions 1318A and 1318B fit within openings 1220A 1220B. The mating contact portions are separated by wall 1230. The distal ends 1320A and 1320B of mating contact portions 1318A and 1318B may be aligned with openings, such as opening 1222B, in platform 1232. These openings may be positioned to receive pins from the mating pin module 300. Wall 1230, platform 1232 and insulative projecting members 1042A and 1042B may be formed as part of portion 1110, such as in one molding operation. However, any suitable technique may be used to form these members.

FIG. 12 shows a further technique that may be used, instead of or in addition to techniques described above, for reducing energy in undesired modes of propagation within the waveguides formed by the reference conductors in transition regions 1150. Conductive or lossy material may be integrated into each module so as to reduce excitation of undesired modes or to damp undesired modes. FIG. 12, for example, shows lossy region 1215. Lossy region 1215 may be configured to fall along the center line between signal conductors 1310A and 1310B in some or all of region 1150. Because signal conductors 1310A and 1310B jog in different directions through that region to implement the edge to broadside transition, lossy region 1215 may not be bounded by surfaces that are parallel or perpendicular to the walls of the waveguide formed by the reference conductors. Rather, it may be contoured to provide surfaces equidistant from the edges of the signal conductors 1310A and 1310B as they twist through region 1150. Lossy region 1215 may be electrically connected to the reference conductors in some embodiments. However, in other embodiments, the lossy region 1215 may be floating.

Though illustrated as a lossy region 1215, a similarly positioned conductive region may also reduce coupling of energy into undesired waveguide modes that reduce signal integrity. Such a conductive region, with surfaces that twist through region 1150, may be connected to the reference conductors in some embodiments. While not being bound by any particular theory of operation, a conductor, acting as a wall separating the signal conductors and as such twists to follow the twists of the signal conductors in the transition region, may couple ground current to the waveguide in such a way as to reduce undesired modes. For example, the current may be coupled to flow in a differential mode through the walls of the reference conductors parallel to the broadside coupled signal conductors, rather than excite common modes.

Figure 13:
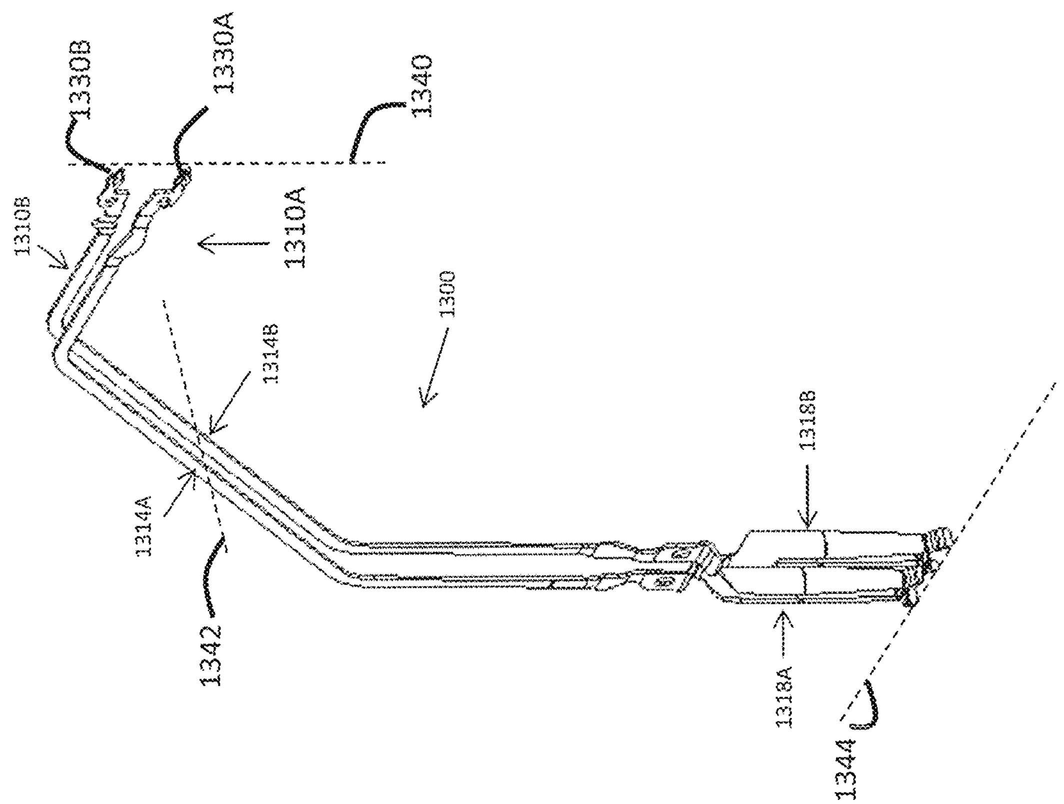
FIG. 13 is an isometric view of a pair of conducting elements of a wafer module of the wafer assembly of FIG. 7.

FIG. 13 shows in greater detail the positioning of conductive members 1310A and 1310B, forming a pair 1300 of signal conductors. In the embodiment illustrated, conductive members 1310A and 1310B each have edges and broader sides between those edges. Contact tails 1330A and 1330B are aligned in a column 1340. With this alignment, edges of conductive elements 1310A and 1310B face each other at the contact tails 1330A and 1330B. Other modules in the same wafer will similarly have contact tails aligned along column 1340. Contact tails from adjacent wafers will be aligned in parallel columns. The space between the parallel columns creates routing channels on the printed circuit board to which the connector is attached. Mating contact portions 1318A and 1318B are aligned along column 1344. Though the mating contact portions are tubular, the portions of conductive elements 1310A and 1310B to which mating contact portions 1318A and 1318B are attached are edge coupled. Accordingly, mating contact portions 1318A and 1318B may similarly be said to be edge coupled.

In contrast, intermediate portions 1314A and 1314B are aligned with their broader sides facing each other. The intermediate portions are aligned in the direction of row 1342. In the example of FIG. 13, conductive elements for a right angle connector are illustrated, as reflected by the right angle between column 1340, representing points of attachment to a daughtercard, and column 1344, representing locations for mating pins attached to a backplane connector.

In a conventional right angle connector in which edge coupled pairs are used within a wafer, within each pair the conductive element in the outer row at the daughtercard is longer. In FIG. 13, conductive element 1310B is attached at the outer row at the daughtercard. However, because the intermediate portions are broadside coupled, intermediate portions 1314A and 1314B are parallel throughout the portions of the connector that traverse a right angle, such that neither conductive element is in an outer row. Thus, no skew is introduced as a result of different electrical path lengths.

Moreover, in FIG. 13, a further technique for avoiding skew is introduced. While the contact tail 1330B for conductive element 1310B is in the outer row along column 1340, the mating contact portion of conductive element 1310B (mating contact portion 1318B) is at the shorter, inner row along column 1344. Conversely, contact tail 1330A conductive element 1310A is at the inner row along column 1340 but mating contact portion 1318A of conductive element 1310A is in the outer row along column 1344. As a result, longer path lengths for signals traveling near contact tails 1330B relative to 1330A may be offset by shorter path lengths for signals traveling near mating contact portions 1318B relative to mating contact portion 1318A. Thus, the technique illustrated may further reduce skew.

Figure 14B:
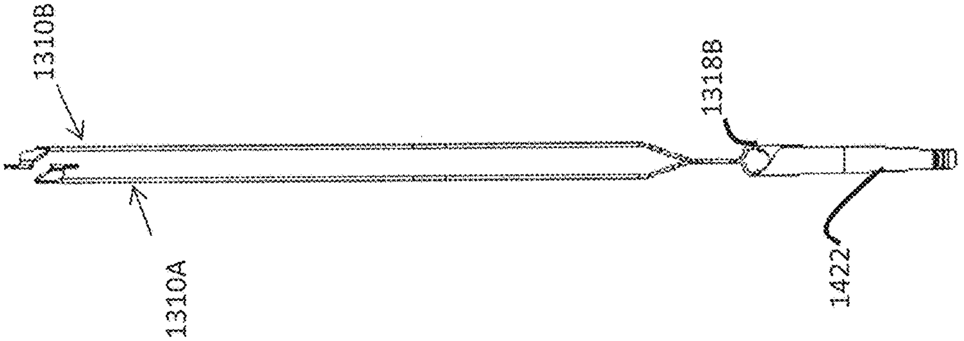
FIG. 14B is an end view of the pair of conducting elements of FIG. 13 taken along the line B-B of FIG. 14A.
Figure 14A:
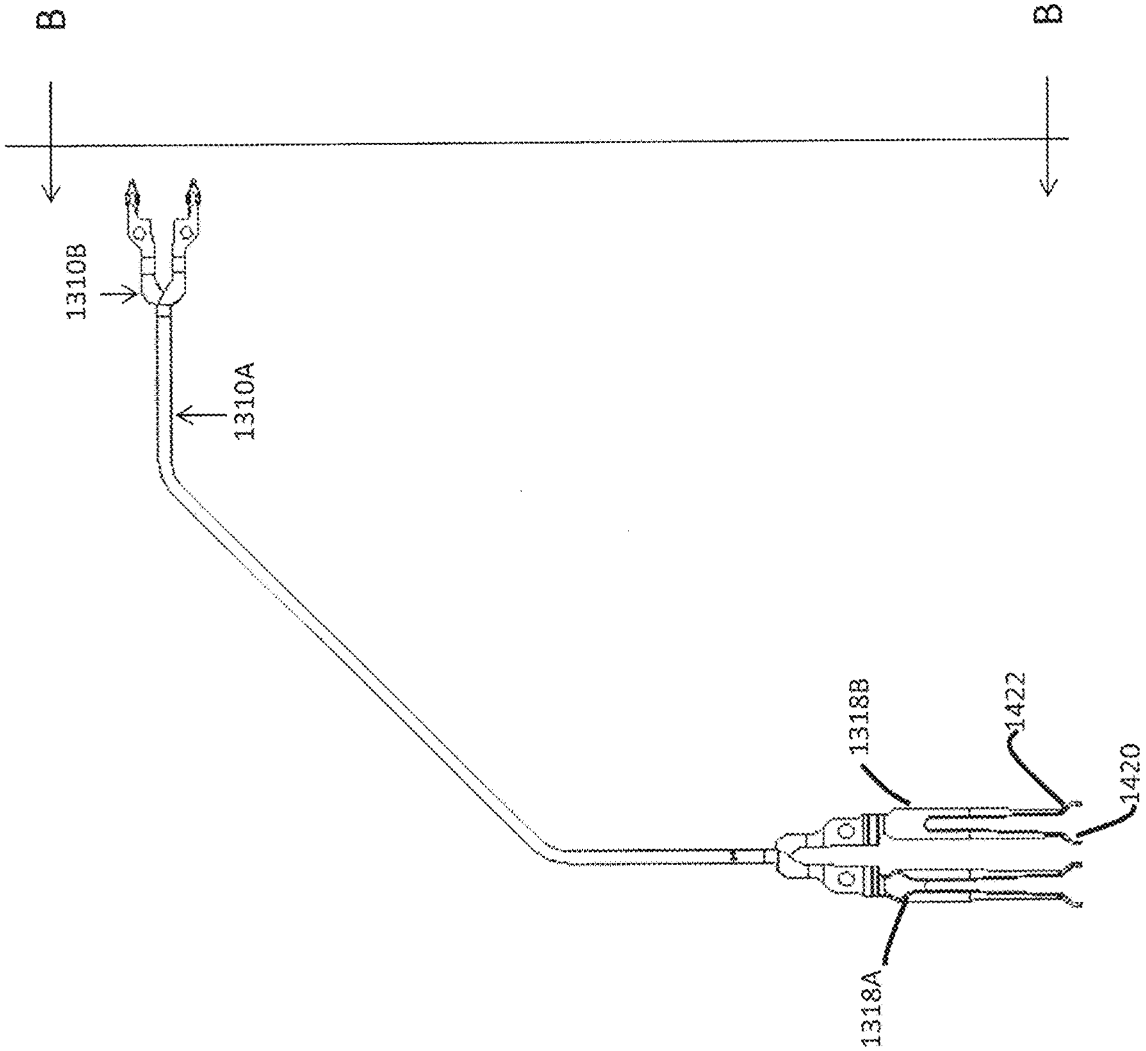
FIG. 14A is a side view of the pair of conducting elements of FIG. 13.

FIGS. 14A and 14B illustrate the edge and broadside coupling within the same pair of signal conductors. FIG. 14A is a side view, looking in the direction of row 1342. FIG. 14B is an end view, looking in the direction of column 1344. FIGS. 14A and 14B illustrate the transition between edge coupled mating contact portions and contact tails and broadside coupled intermediate portions.

Additional details of mating contact portions such as 1318A and 1318B are also visible. The tubular portion of mating contact portion 1318A is visible in the view shown in FIG. 14A and of mating contact portion 1318B in the view shown in FIG. 14B. Beams, of which beams 1420 and 1422 of mating contact portion 1318B are numbered, are also visible.

Figure 15:
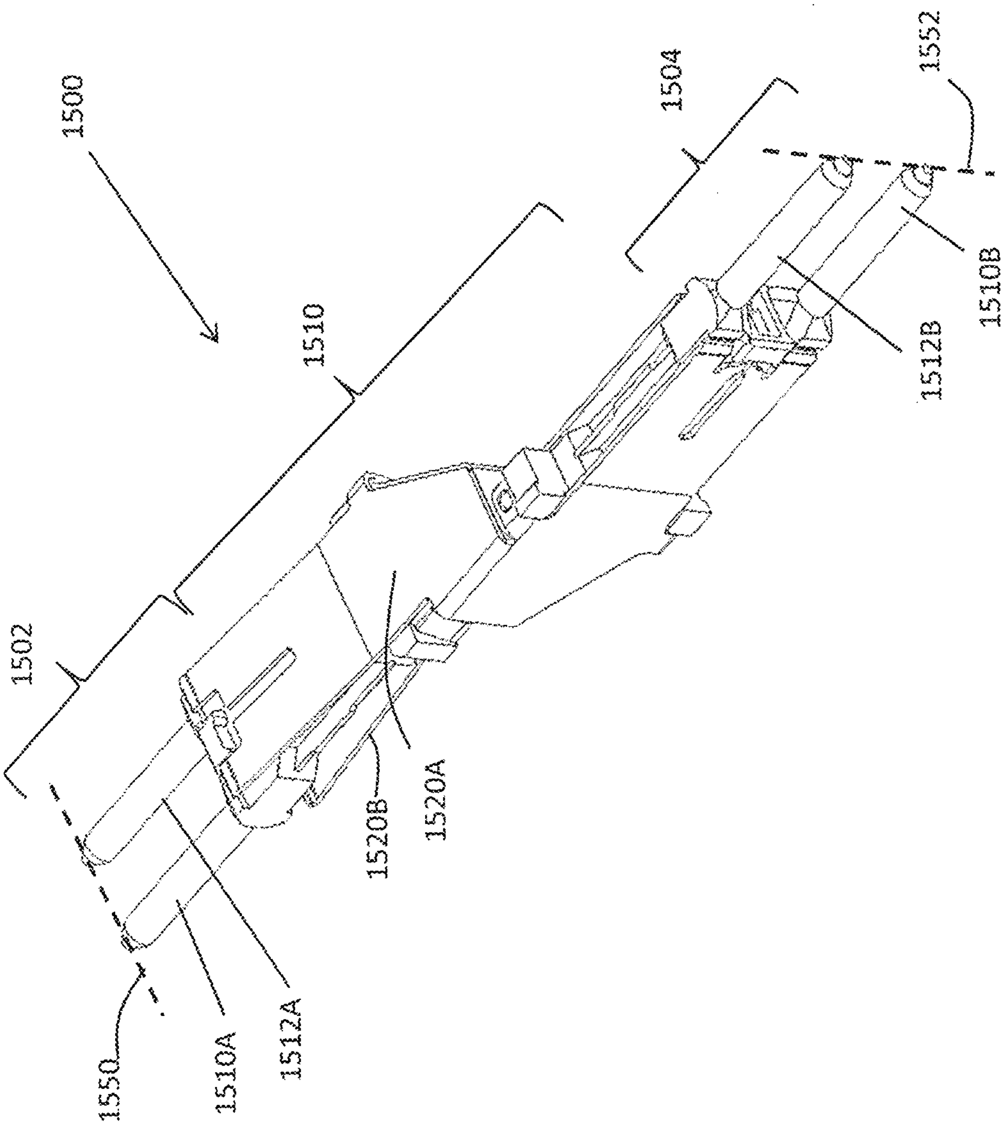
FIG. 15 is an isometric view of an extender module.

FIG. 15 illustrates one embodiment of an extender module 1500 that may be used in an orthogonal connector. The extender module includes a pair of signal conductors that have first mating contact portions 1510A and 1512A, and second mating contact portions 1510B and 1512B. The first and second mating contact portions are positioned at a first end 1502 and a second end 1504 of the extender module, respectively. As illustrated, the first mating contact portions are positioned along a first line 1550 that is orthogonal to a second line 1552 along which the second mating contact portions are positioned. In the depicted embodiment, the mating contact portions are shaped as pins and are configured to mate with a corresponding mating contact portion of a connector module 810; however, it should be understood that other mating interfaces, such as beams, blades, or any other suitable structure also may be used for the mating contact portions as the current disclosure is not so limited. As described in more detail below, conductive shield elements 1520A and 1520B are attached to opposing sides of the extender module 1500 in an intermediate portion 1510 between the first end 1502 and the second end 1504. The shield elements surround the intermediate portion such that the signal conductors within the extender module are fully shielded.

Figure 16C:
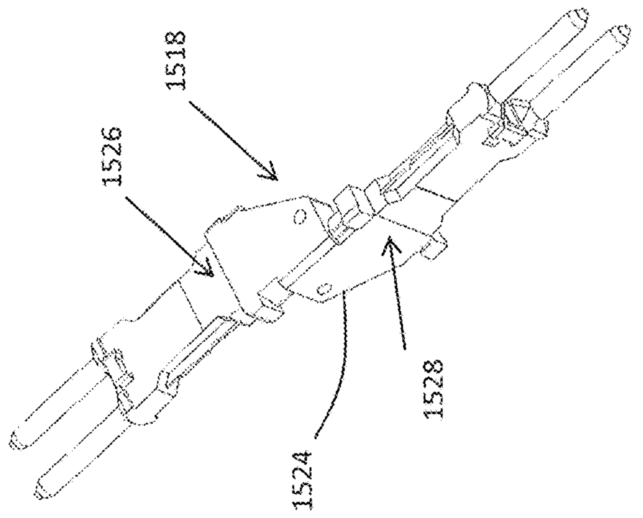
FIG. 16C is an isometric view of a portion of the extender module of FIG. 15.
Figure 16B:
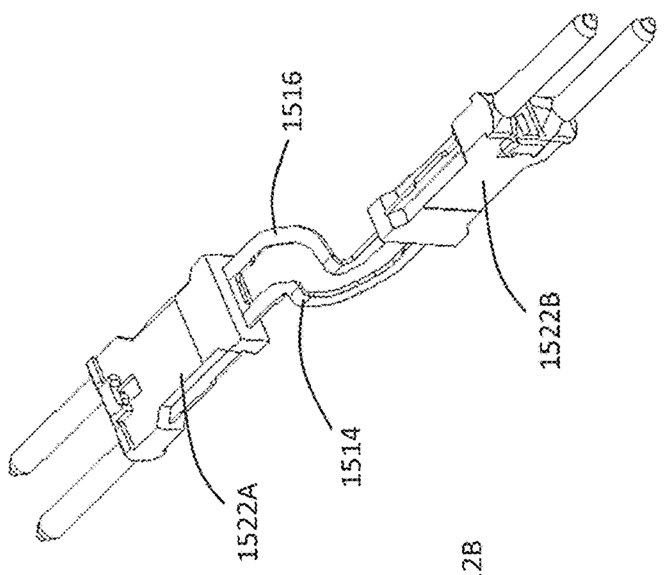
FIG. 16B is an isometric view of a portion of the extender module of FIG. 15.
Figure 16A:
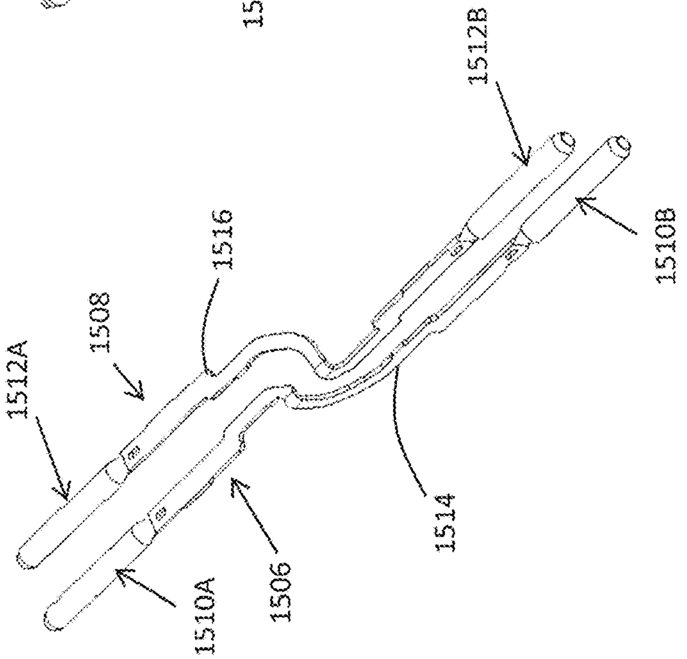
FIG. 16A is an isometric view of a portion of the extender module of FIG. 15.

FIGS. 16A-16C illustrate further details of the signal conductors 1506 and 1508 disposed within the extender module 1500. Insulative portions of the extender module are also visible, as the shield elements 1520A and 1520B are not visible in these views. As shown in in FIG. 16A, the first and second signal conductors are each formed as a single piece of conducting material with mating contact portions 1510 and 1512 connected by intermediate portions 1514 and 1516. The intermediate portions include a 90° bend such that the first mating portions are orthogonal to the second mating portions, as discussed above. Further, as illustrated, the bends in the first and second signal conductors are offset such that the lengths of the two signal conductors are substantially the same; such a construction may be advantageous to reduce and/or eliminate skew in a differential signal carried by the first and second signal conductors.

Referring now to FIGS. 16B and 16C, the intermediate portions 1514 and 1516 of signal conductors 1506 and 1508 are disposed within insulating material 1518. First and second portions of insulating material 1518A and 1518B are formed adjacent to the mating contact portions 1510 and 1512, and a third insulating portion 1522 is formed between the first and second portions around the intermediate portion of the signal conductors. Although in the depicted embodiment, the insulating material is formed as three separate portions, it should be understood that in other embodiments the insulating may be formed as a single portion, two portions, or as more than three portions, as the current disclosure is not so limited. The insulated portions 1518 and 1522 define orthogonal planar regions 1526 and 1528 on each side of the extender module to which the conductive elements 1520A and 1520B attach. Moreover, it is not a requirement that an extender module be formed using operations in the sequence illustrated in FIGS. 16A-16C. For example, the insulated portions 1522A and 1522B might be molded around conductive elements 1520A and 1520B prior to those conductive elements being bent at a right angle.

Figure 17:
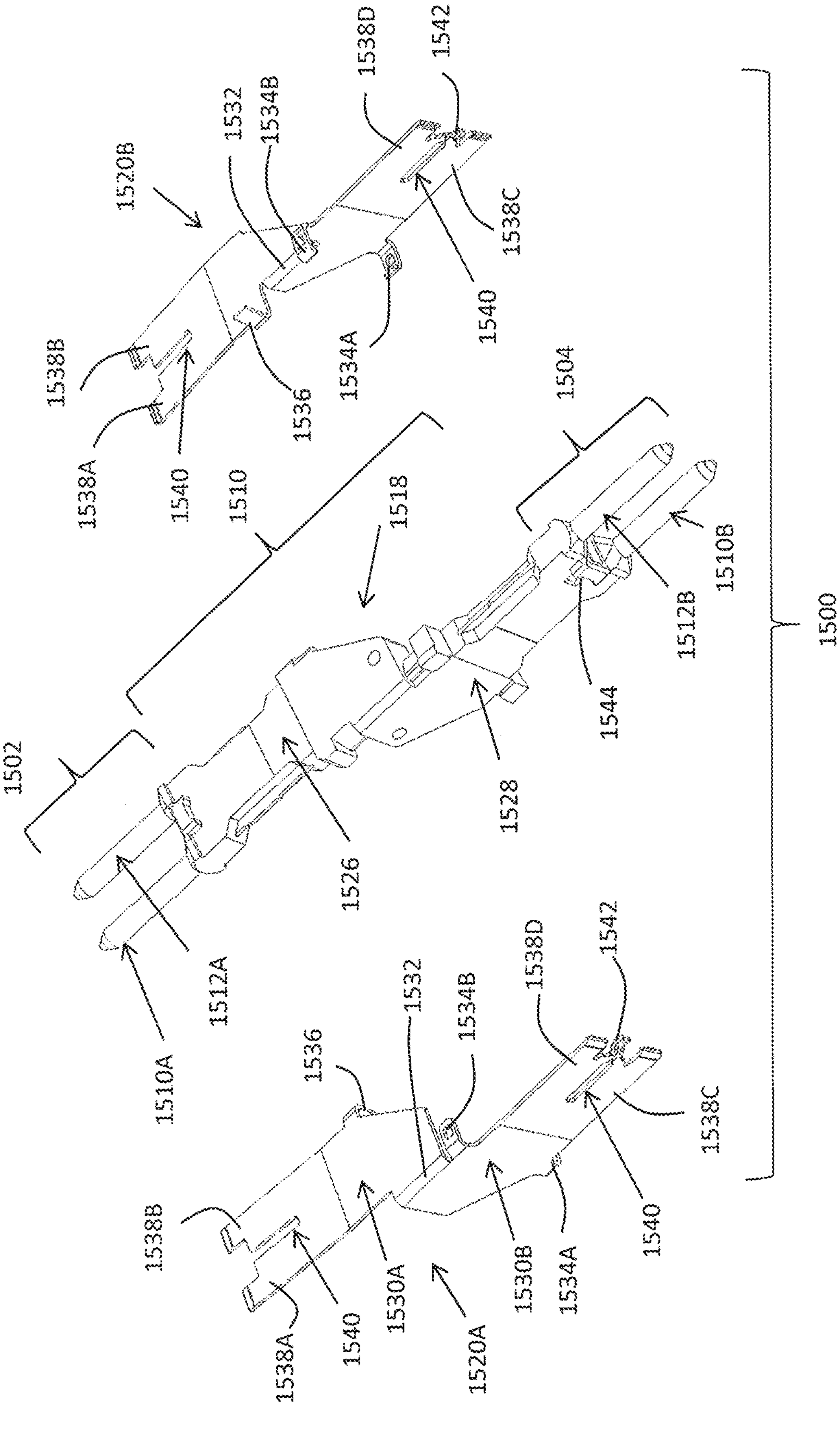
FIG. 17 is an isometric view, partially exploded, of the extender module of FIG. 15.

FIG. 17 shows an exploded view of an extender module 1500 and illustrates further details of the conductive shield elements 1520A and 1520B. The shield elements are shaped to conform to the insulating material 1518. As illustrated, the first shield element 1520A is configured to cover an outer surface of the extender module, and the second shield element 1520B is configured to cover an inner surface. In particular, the shield elements include first and second planar portions 1530A and 1530B shaped to attach to planar regions 1526 and 1528, respectively, and the planar portions are separated by a 90° bend 1532 such that the planar portions are orthogonal. The shield elements further include retention clips 1534A and 1534B, and tabs 1536, each of which attach to a corresponding feature on the insulating material 1518 or an opposing shield element to secure the shield elements to the extender module.

In the illustrated embodiment, the conductive shield elements 1520A and 1520B include mating contact portions formed as four compliant beams 1538A . . . 1538D. When assembled (FIG. 15), two of the compliant beams 1538A and 1538B are adjacent the first end 1502 of the extender module 1500; the other two compliant beams 1538C and 1538D are adjacent the second end 1504. Each pair of compliant beams is separated by an elongated notch 1540.

Figure 18:
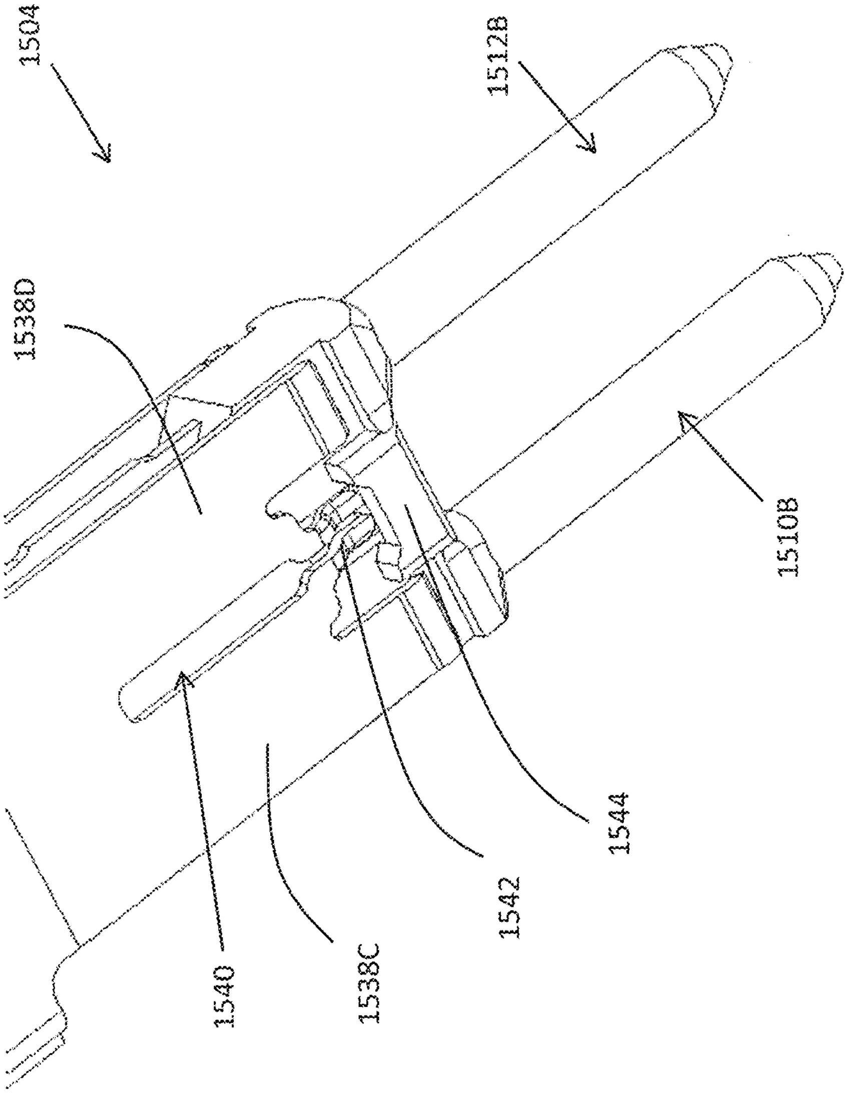
FIG. 18 is an isometric view of a portion of the extender module of FIG. 15.

In some embodiments, the conductive shield elements 1520A and 1520B may have the same construction at each end, such that shield elements 1520A and 1520B may have the same shape, but a different orientation. However, in the embodiment illustrated shield elements 1520A and 1520B have a different construction at the first end 1502 and second end, respectively, such that shield elements 1520A and 1520B have different shapes. For example, as illustrated in FIG. 18, the compliant beams 1538C and 1538D adjacent the second end include fingers 1542 which are received in a corresponding pocket 1544. The fingers and pocket are constructed and arranged to introduce a pre-loading in the compliant beams which may aid in providing a reliable mating interface. For example, the pre-loading may cause the compliant beams to curve or bow outward from the extender module to promote mating contact as the second end of the extender module is received in a corresponding connector module.

Figure 19:
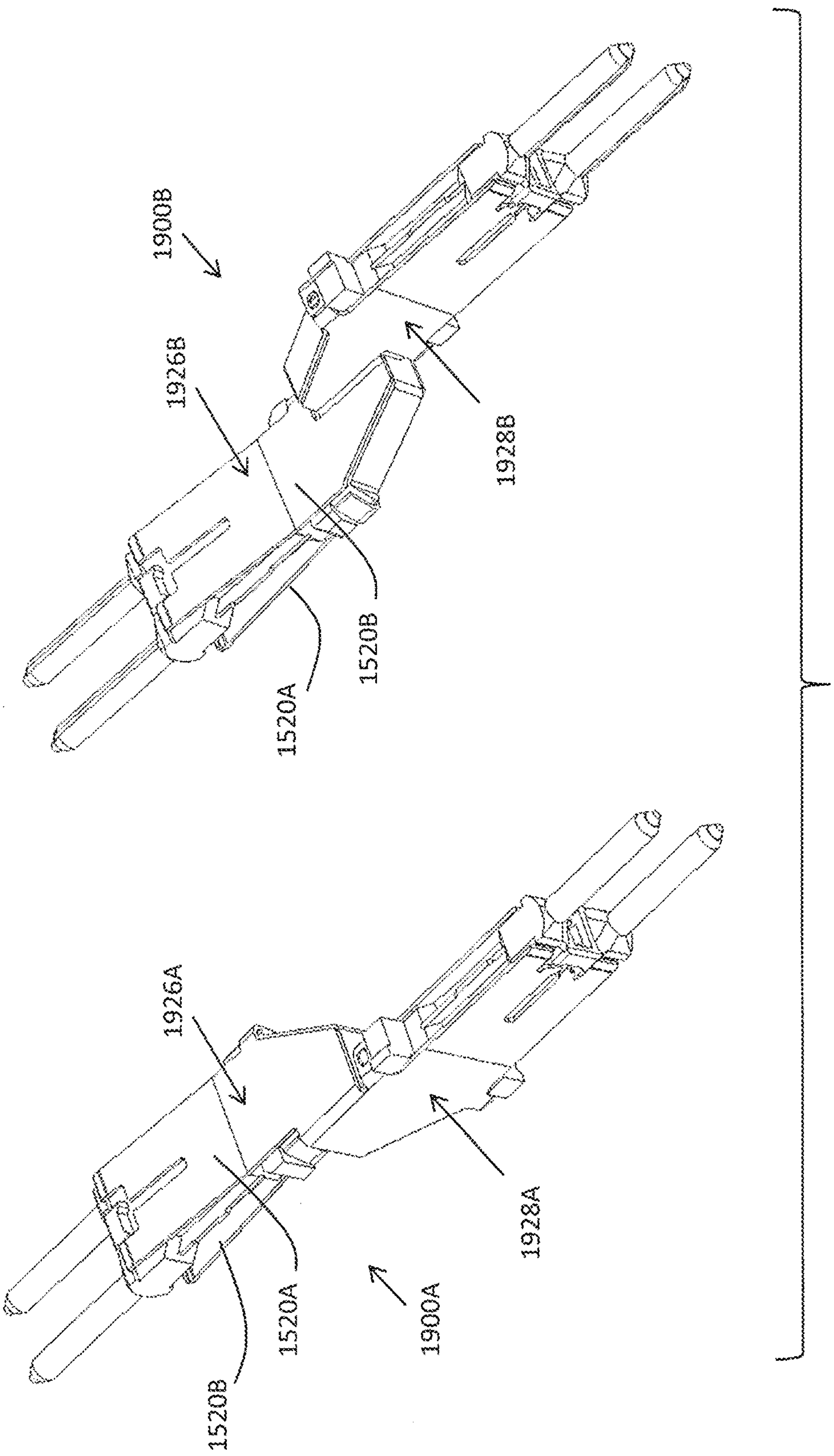
FIG. 19 is an isometric view of two extender modules, oriented with 180 degree rotation.
Figures 20A, 20B, 20C:
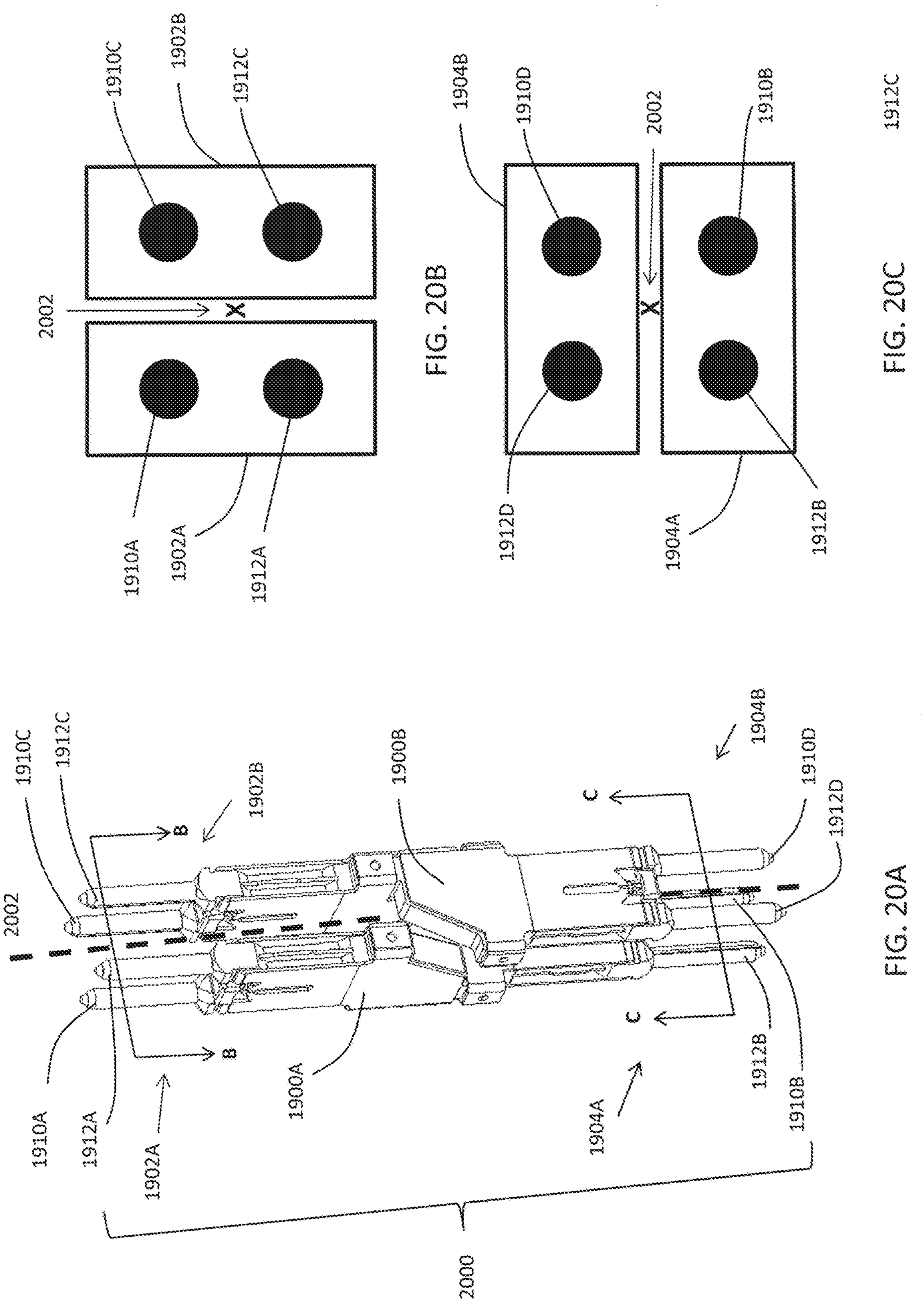
FIG. 20A is an isometric view of an assembly of the two extender modules of FIG. 19.
FIG. 20B is a schematic representation of one end of the assembly of FIG. 20A taken along line B-B.
FIG. 20C is a schematic representation of one end of the assembly of FIG. 20A taken along line C-C.

Referring now to FIG. 19, two identical extender modules 1900A and 1900B are illustrated rotated 180° with respect to each other along a longitudinal axis of each module. As described in more detail below, the extender modules are shaped such that two modules may interlock when rotated in this manner to form a an extender module assembly 2000 (FIG. 20A). When interlocked in this manner, the first and second planar portions 1926A and 1928A on the first module are adjacent and parallel to the first and second planar portions 1926B and 1928B, respectively, on the second module.

FIG. 20A shows an extender module assembly including the two extender modules 1900A and 1900B of FIG. 19. As illustrated, the mating portions of the signal conductors 1910A . . . 1910D and 1912A . . . 1912D form two square arrays of mating contacts at the ends of the assembly. FIGS. 20B-20C illustrate schematic top and bottom views of the square arrays, respectively, and show the relative orientations of the mating portions of each signal conductor in the extender modules. In the depicted embodiment, the assembly has a center line 2002 parallel to a longitudinal axis of each extender module, and the center of each of the square arrays is aligned with the center line.

Figure 21:
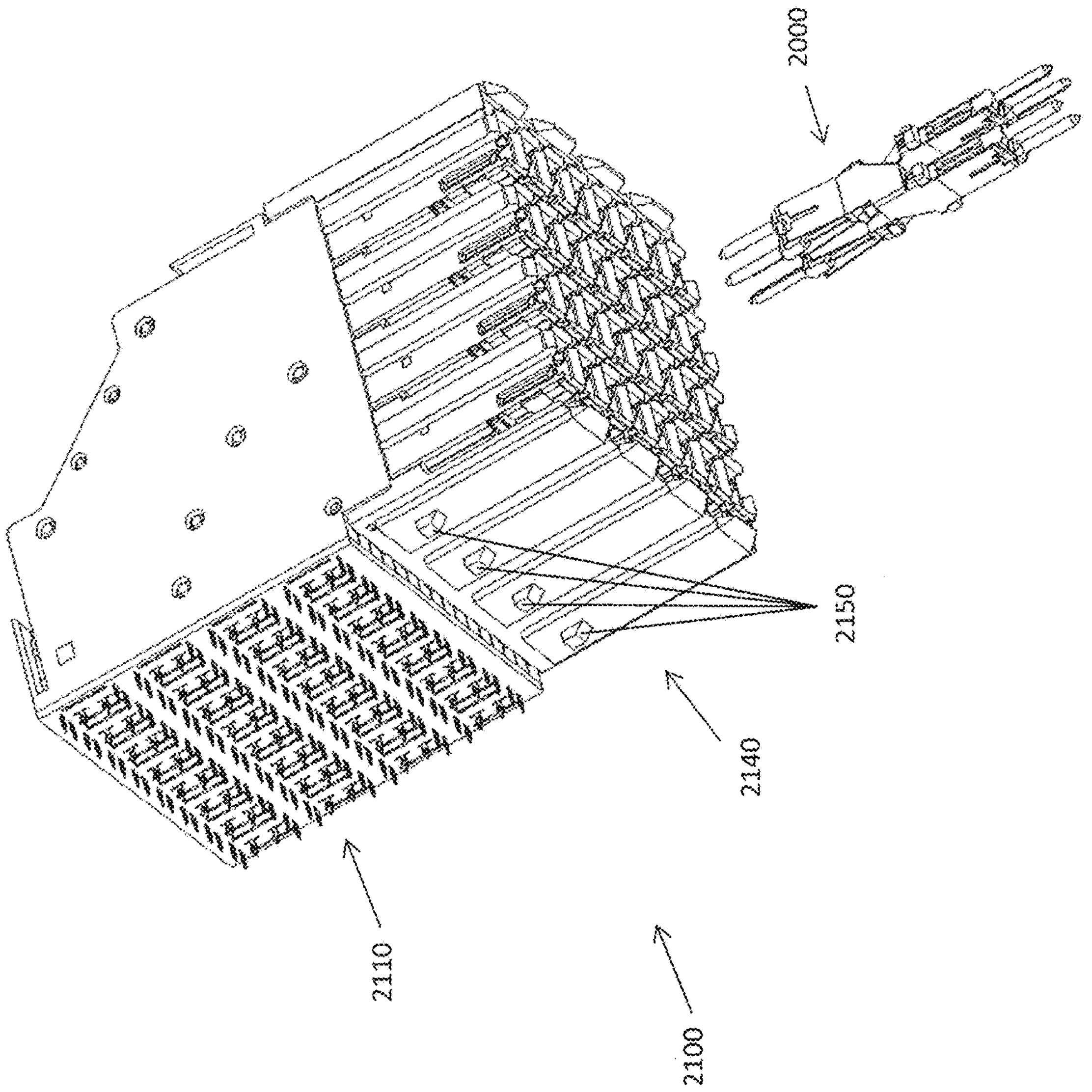
FIG. 21 is an isometric view of a connector and the assembly of extender modules of FIG. 20A.

FIG. 21 illustrates one embodiment of an orthogonal connector 2100 during a stage of manufacture. Similar to daughter card connector 600, the orthogonal connector is assembled from connector modules and includes contact tails 2110 extending from a surface of the connector adapted for mounting to a printed circuit board. However, the connector 2100 further includes a front housing 2140 adapted to receive a plurality of extender modules. The front housing also includes retaining features 2150 to engage with corresponding features on an extender shell 2300, as described below. As shown, assemblies 2000 of extender modules may be simply slid into the front housing to facilitate simple assembly of a connector 2100.

FIG. 21 shows two, interlocked extender modules being inserter into the connector components. Inserting a pair of extender modules already interlocked avoids complexities of interlocking the extender modules after one is already inserted, but it should be appreciated that other techniques may be used to assemble the extender modules to the connector components. As an example of another variation, multiple pairs of extender modules may be inserted in one operation.

Figure 22:
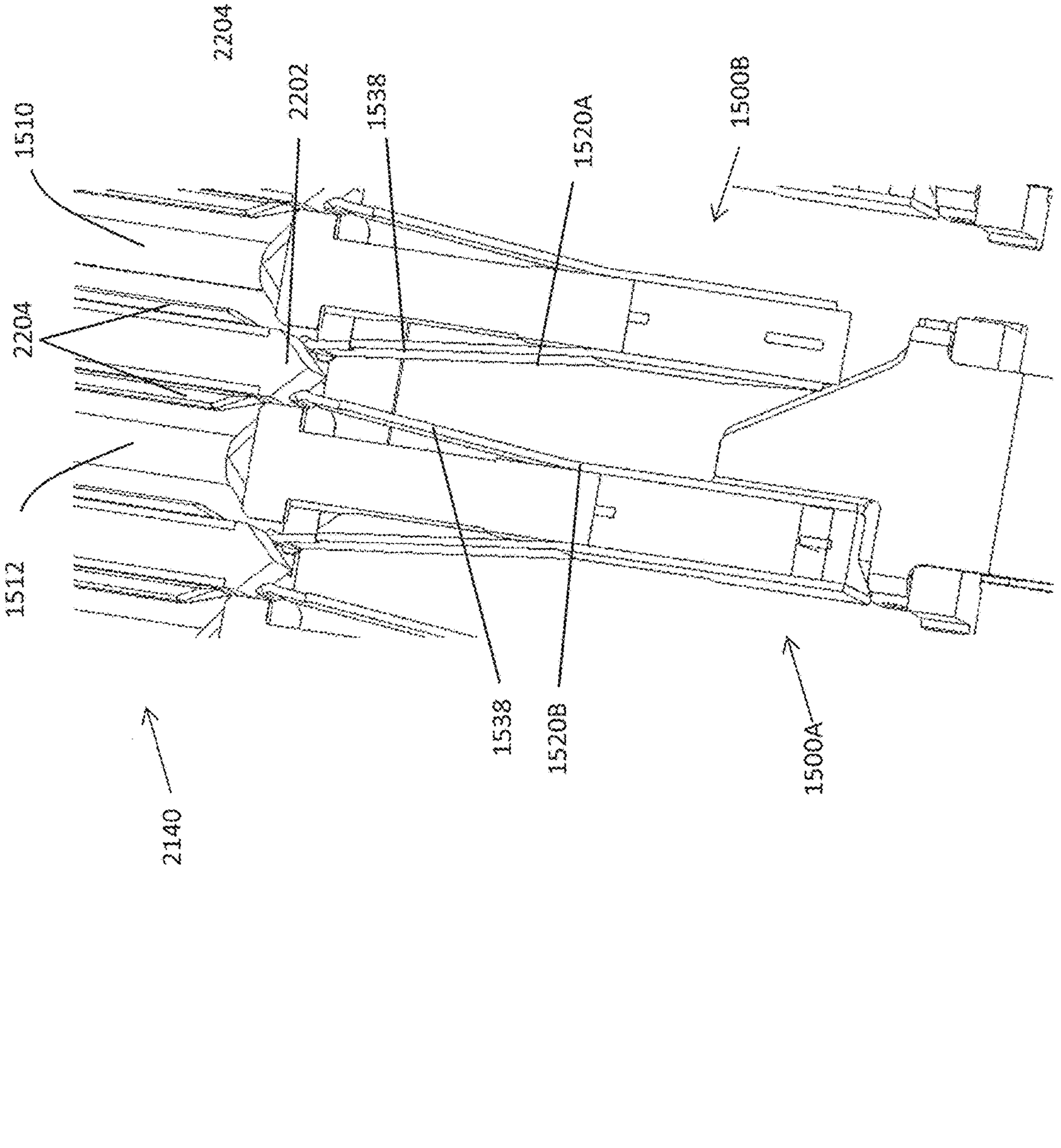
FIG. 22 is an isometric view of a portion of the mating interface of the connector of FIG. 21.

FIG. 22 shows a cross section of a partial view of the front housing 2140. In the configuration illustrated, the front housing is partially mated with extender modules 1500A and 1500B. As illustrated, the front housing includes angled surfaces 2202 that deflect the compliant beams 1538 as the extender modules are inserted into the front housing. Once inserted past angled surfaces 2202, the compliant beams can spring outwards to contact mating surfaces 2204 disposed within the front housing. In this fashion, the front housing promotes contact between the conductive shield elements 1520A and 1520B on the extender modules and the connector 2100.

Figure 23B:
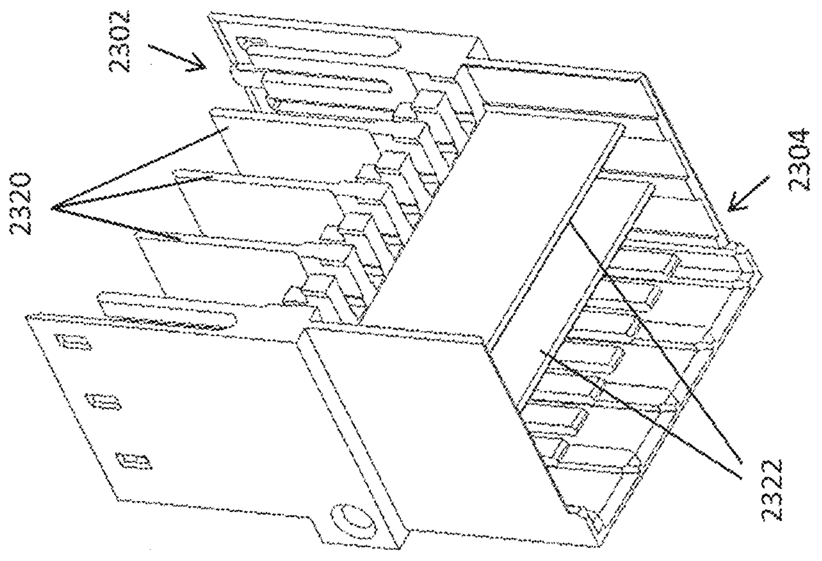
FIG. 23B is a perspective view, partially cut away, of the extender shell of FIG. 23A.
Figure 23A:
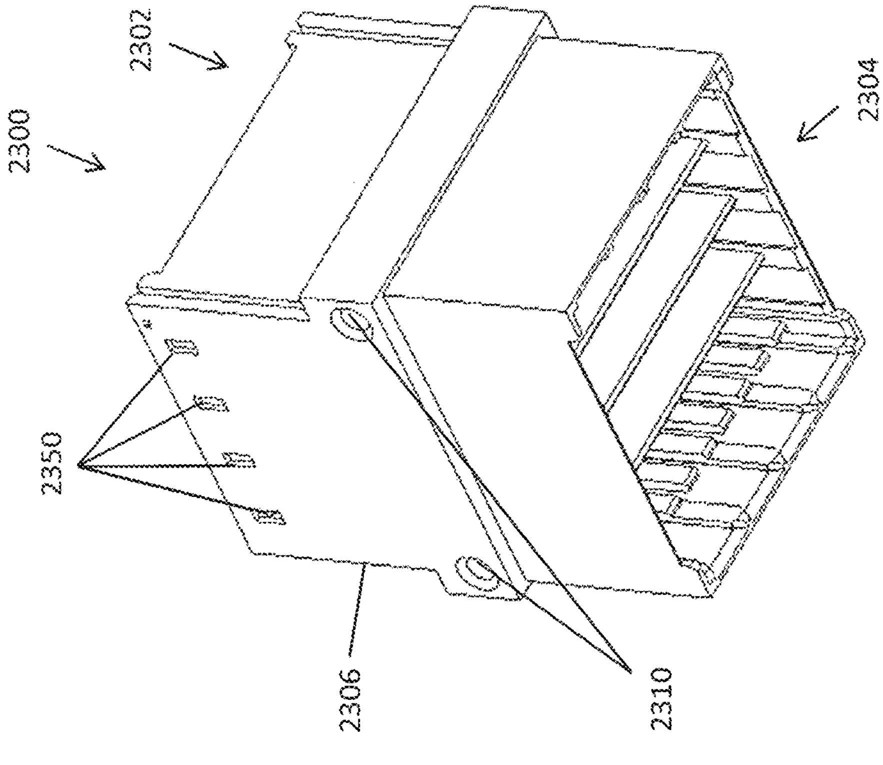
FIG. 23A is an isometric view of an extender shell.

FIG. 23A depicts one embodiment of an extender shell 2300 for use with a direct attach orthogonal connector. The extender shell has a first side 2302 adapted to attach to the front housing 2140 of an orthogonal connector 2100. As shown, the first side includes cutouts 2350 in the outer wall 2306 adapted to engage with the retaining features 2150 on front housing 2140. As discussed below, the second side 2304 of the extender shell is configured for separable mating with a daughter card connector (e.g., a RAF connector). Further, the extender shell includes mounting holes 2310 which may be used to attach the extender shell to additional components of an interconnection system, such as a printed circuit board. A cross-sectional view of the extender shell is shown in FIG. 23B. Similar to the backplane connector 200, the extender shell includes lossy or conductive dividers 2320 and 2322 disposed in the first and second side of the extender shell, respectively.

Figure 24B:
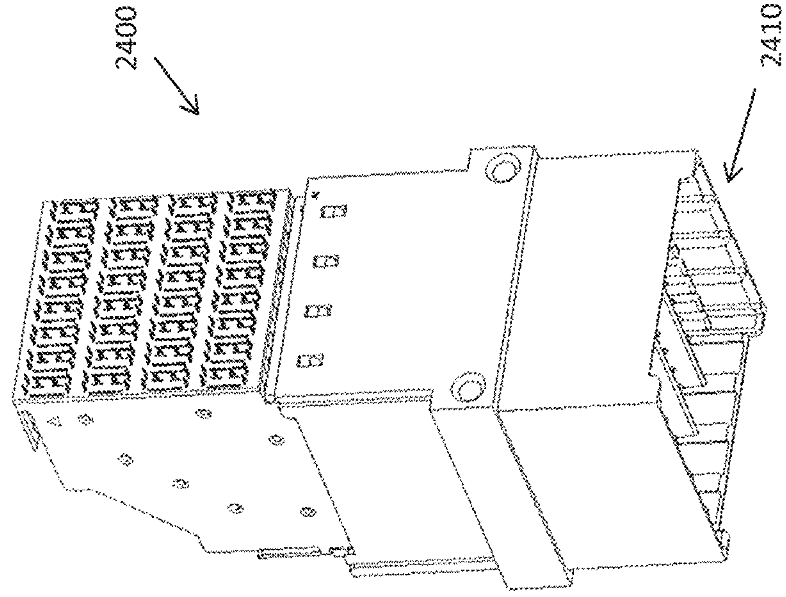
FIG. 24B is an isometric view of an assembled orthogonal connector.
Figure 24A:
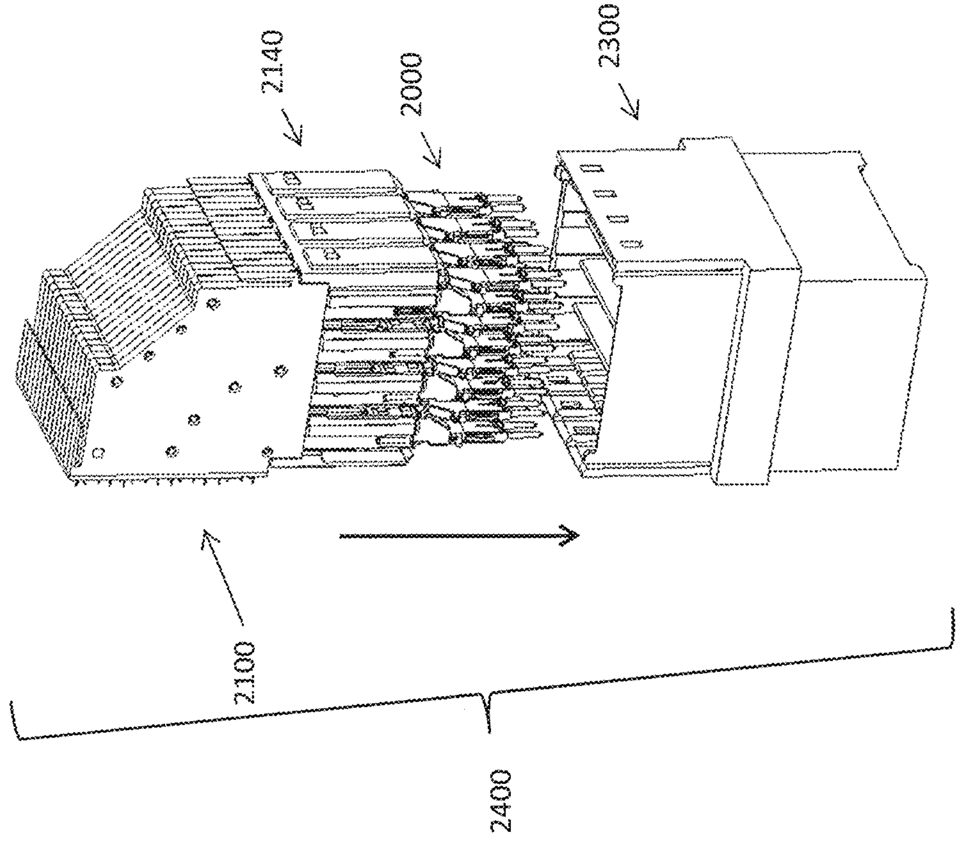
FIG. 24A is an isometric view, partially exploded, of an orthogonal connector.

Referring now to FIGS. 24A-24B, a direct attach connector 2400 includes an orthogonal connector 2100 having a front housing 2150 adapted to engage with an extender shell 2300. A plurality of extender modules are arranged as assemblies 2000 with shielded signal contacts positioned in square arrays, and the first ends of the extender modules are received in the front housing. As illustrated, the extender shell I splaced over the extender modules and then secured to form connector 2400; the connector includes a mating end 2410 which may attach and mate with a connector such as daughter card connector 600 on an orthogonal printed circuit board, as discussed below.

Figure 25:
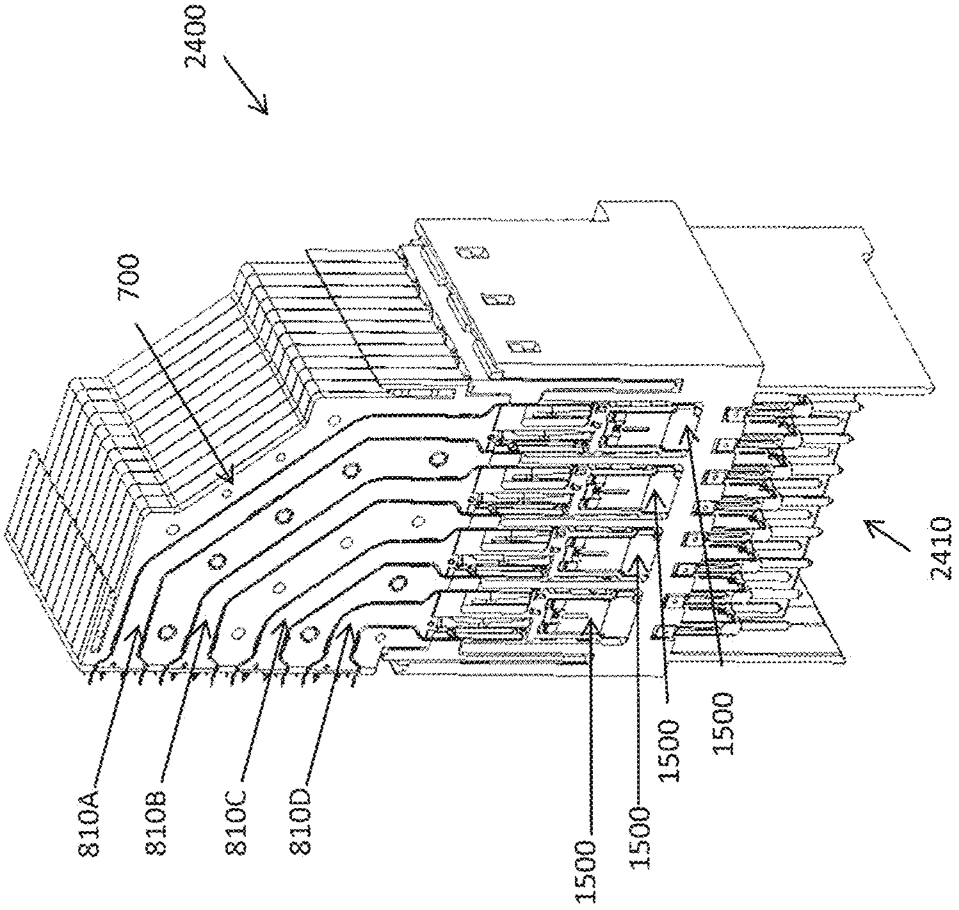
FIG. 25 is a cross-sectional view of the orthogonal connector of FIG. 24B.

FIG. 25 is a cross-sectional view of the assembled connector 2400. The mating ends of the extender modules 1500 are received in corresponding connector modules 810A . . . 810D on wafers 700. In the depicted embodiment, the extender modules are disposed within the extender shell. Further, the mating contact portions of the extender modules that are mated with the connector modules are orthogonal to the mating contact portions that extend into the mating end 2410 of the connector such that the connector may be used as a direct attach orthogonal connector.

Figure 26:
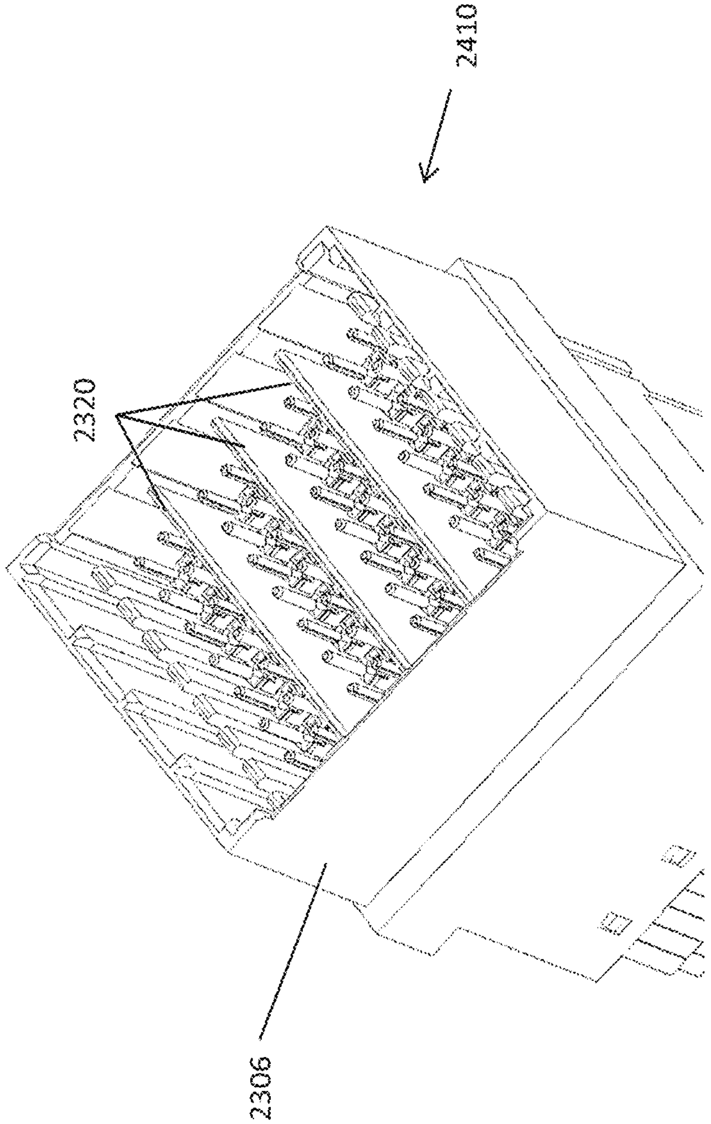
FIG. 26 is an isometric view of a portion of the orthogonal connector of FIG. 24B.

FIG. 26 is a detailed view of the mating end 2410 of the connector 2400. The pins forming the mating contact portions of the extender modules are organized in an array of differential signal pairs, forming a mating interface. As discussed above, lossy or conductive dividers 2320 separate rows of signal pins.

Figure 27:
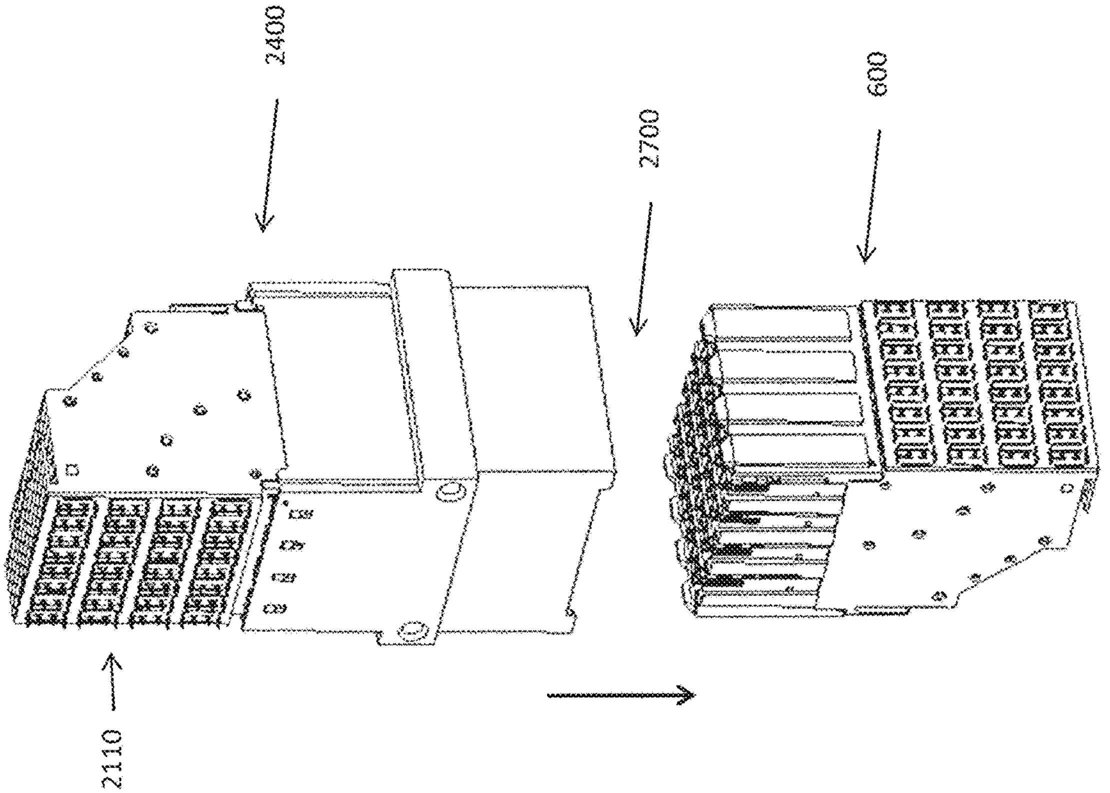
FIG. 27 is an isometric view, partially exploded, of an electronic system including the orthogonal connector of FIG. 24B and the daughtercard connector of FIG. 6.

FIG. 27 depicts one embodiment of an assembled orthogonal connector 2400 that may directly attach to a RAF connector such as daughter card connector 600 via a separable interface 2700. As shown, the contact tails 2210 of the connector 2400 are oriented orthogonally to the contact tails 610 of the daughter card connector 610. In this manner, printed circuit boards (not shown for simplicity) to which the connectors may be attached by their contact tails may be oriented orthogonally. It should be understood that although one orthogonal configuration for the connectors 2400 and 600 is depicted, in other embodiments, the daughtercard connector may be rotated 180° to form a second orthogonal configuration. For example, the depicted configuration may correspond to a 90° rotation of connector 600 relative to connector 2400, and a second orthogonal configuration (not depicted) may correspond to a 270° rotation.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein. For example, examples of techniques are described for improving signal quality at the mating interface of an electrical interconnection system. These techniques may be used alone or in any suitable combination. Furthermore, the size of a connector may be increased or decreased from what is shown. Also, it is possible that materials other than those expressly mentioned may be used to construct the connector. As another example, connectors with four differential signal pairs in a column are used for illustrative purposes only. Any desired number of signal conductors may be used in a connector.

As another example, an embodiment was described in which a different front housing portion is used to hold connector modules in a daughter card connector configuration versus an orthogonal configuration. It should be appreciated that, in some embodiments, a front housing portion may be configured to support either use.

Manufacturing techniques may also be varied. For example, embodiments are described in which the daughtercard connector 600 is formed by organizing a plurality of wafers onto a stiffener. It may be possible that an equivalent structure may be formed by inserting a plurality of shield pieces and signal receptacles into a molded housing.

As another example, connectors are described that are formed of modules, each of which contains one pair of signal conductors. It is not necessary that each module contain exactly one pair or that the number of signal pairs be the same in all modules in a connector. For example, a 2-pair or 3-pair module may be formed. Moreover, in some embodiments, a core module may be formed that has two, three, four, five, six, or some greater number of rows in a single-ended or differential pair configuration. Each connector, or each wafer in embodiments in which the connector is waferized, may include such a core module. To make a connector with more rows than are included in the base module, additional modules (e.g., each with a smaller number of pairs such as a single pair per module) may be coupled to the core module.

Furthermore, although many inventive aspects are shown and described with reference to a daughterboard connector having a right angle configuration, it should be appreciated that aspects of the present disclosure is not limited in this regard, as any of the inventive concepts, whether alone or in combination with one or more other inventive concepts, may be used in other types of electrical connectors, such as backplane connectors, cable connectors, stacking connectors, mezzanine connectors, I/O connectors, chip sockets, etc.

In some embodiments, contact tails were illustrated as press fit "eye of the needle" compliant sections that are designed to fit within vias of printed circuit boards. However, other configurations may also be used, such as surface mount elements, spring contacts, solderable pins, etc., as aspects of the present disclosure are not limited to the use of any particular mechanism for attaching connectors to printed circuit boards.

Further, signal and ground conductors are illustrated as having specific shapes. In the embodiments above, the signal conductors were routed in pairs, with each conductive element of the pair having approximately the same shape so as to provide a balanced signal path. The signal conductors of the pair are positioned closer to each other than to other conductive structures. One of skill in the art will understand that other shapes may be used, and that a signal conductor or a ground conductor may be recognized by its shape or measurable characteristics. A signal conductor in many embodiments may be narrow relative to other conductive elements that may serve as reference conductors to provide low inductance. Alternatively or additionally, the signal conductor may have a shape and position relative to a broader conductive element that can serve as a reference to provide a characteristic impedance suitable for use in an electronic system, such as in the range of 50-120 Ohms. Alternatively or additionally, in some embodiments, the signal conductors may be recognized based on the relative positioning of conductive structures that serve as shielding. The signal conductors, for example, may be substantially surrounded by conductive structures that can serve as shield members.

Further, the configuration of connector modules and extender modules as described above provides shielding of signal paths through the interconnection system formed by connector modules and extender modules in a first connector and connector modules in a second connector. In some embodiments, minor gaps in shield members or spacing between shield members may be present without materially impacting the effectiveness of this shielding. It may be impractical, for example, in some embodiments, to extend shielding to the surface of a printed circuit board such that there is a gap on the order of 1 mm. Despite such separation or gaps, these configurations may nonetheless be regarded as fully shielded.

Moreover, examples of an extender are module are pictured with an orthogonal configuration. It should be appreciated that, without a 90 degree twist, the extender modules may be used to form a RAM, if the extender module has pins or blades at its second end. Other types of connectors may alternatively be formed with modules with receptacles or mating contacts of other configurations at the second end.

Moreover, the extender modules are illustrated as forming a separable interface with connector modules. Such an interface may include gold plating or plating with some other metal or other material that may prevent oxide formation. Such a configuration, for example, may enable modules identical to those used in a daughter card connector to be used with the extender modules. However, it is not a requirement that the interface between the connector modules and the extender modules be separable. In some embodiments, for example, mating contacts of either the connector module or extender module may generate sufficient force to scrape oxide from the mating contact and form a hermetic seal when mated. In such an embodiment, gold and other platings might be omitted.

Accordingly, the present disclosure is not limited to the details of construction or the arrangements of components set forth in the following description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. An extender for an electrical connector, the extender comprising:

a plurality of extender modules, each extender module comprising:

a pair of elongated signal conductors having a first end and a second end, each signal conductor of the pair comprising:

a first contact portion at the first end, the first contact portion configured for engaging with a mating contact portion of the electrical connector;

a second contact portion at the second end, the second contact portion configured for engaging with a mating contact portion of another electrical connector; and an intermediate portion coupling the first contact portion to the second contact portion; and a plurality of lossy dividing members each disposed between a respective pair of extender modules of the plurality of extender modules.

2. The extender of claim 1, wherein the plurality of extender modules are arranged in a plurality of subsets, and the plurality of lossy dividing members are each disposed between subsets of a respective pair of subsets of the plurality of extender modules.

3. The extender of claim 1, further comprising an extender shell supporting the plurality of extender modules and the plurality of lossy dividing members.

4. The extender of claim 2, wherein the plurality of subsets comprise rows of extender modules separated by ones of the plurality of lossy dividing members.

5. The extender of claim 2, wherein the plurality of subsets comprise pairs of extender modules.

6. The extender of claim 5, wherein extender modules of the pairs of extender modules in each subset are rotated 180 degrees with respect to one another.

7. The extender of claim 5, wherein the extender modules of the pairs of extender modules in each subset are interlocked.

8. The extender of claim 5, wherein:

the first contact portions of the plurality of extender modules are arranged in a contact array to form a mating interface; and the first contact portions of the pairs of extender modules of each subset form square subarrays of the contact array.

9. The extender of claim 1, wherein each extender module of the plurality of extender modules further comprises insulating material formed as a single portion, with the intermediate portions of the pair of signal conductors disposed within the insulating material of the single portion.

10. An extender for an electrical connector, the extender comprising:

a plurality of extender modules, each extender module comprising:

a pair of elongated signal conductors having a first end and a second end, each signal conductor of the pair comprising:

a first contact portion at the first end;

a second contact portion at the second end; and an intermediate portion coupling the first contact portion to the second contact portion; and a plurality of lossy dividing members each disposed between a respective pair of extender modules of the plurality of extender modules, wherein:

the first contact portions of the pair of elongated signal conductors are positioned along a first line and extend in a first direction;

the second contact portions of the pair of elongated signal conductors are positioned along a second line and extend parallel to the first direction; and the first line is angularly offset from the second line.

11. The extender of claim 10, wherein the first line is orthogonal to the second line.

12. An electrical connector system, comprising:

an electrical connector comprising a plurality of connector modules, each connector module comprising a pair of signal conductors, each signal conductor of the pair comprising:

a mating contact portion;

a contact tail; and an intermediate portion coupling the mating contact portion to the contact tail; and the extender of claim 1, with the second portions of the plurality of extender modules received by the mating contact portions of the plurality of connector modules of the electrical connector.

13. An extender module for an electrical connector, the extender module comprising:

a pair of elongated signal conductors having a first end and a second end, each signal conductor of the pair comprising:

a first contact portion at the first end;

a second contact portion at the second end; and an intermediate portion coupling the first contact portion to the second contact portion and comprising a bend;

wherein:

the pair of elongated signal conductors have different lengths from the first end to the bend, different lengths from the second end to the bend, and equal lengths from the first end to the second end;

the first contact portions of the pair of elongated signal conductors are positioned along a first line and extend in a first direction;

the second contact portions of the pair of elongated signal conductors are positioned along a second line and extend parallel to the first direction; and the first line is angularly offset from the second line.

14. The extender module of claim 13, wherein the extender module further comprises insulating material formed as a single portion.

15. The extender module of claim 13, wherein the first line is orthogonal to the second line.

16. The extender module of claim 13, further comprising insulating material having a first region and a second region that is orthogonal to the first region, the pair of elongated signal conductors being disposed within the first region of the insulating material at least part of the way from the first end to the bend and disposed within the second region of the insulating material at least part of the way from the second end to the bend.

17. The extender module of claim 16, further comprising first and second conductive shield elements disposed on opposing sides of the first region of the insulating material, respectively, and on opposing sides of the second region of the insulating material, respectively.

18. The extender module of claim 13, further comprising first and second conductive shield elements disposed on respective first and second opposing sides of the pair of elongated signal conductors.

19. An electrical connector system configured for mating with a second electrical connector, the electrical connector system comprising:

an electrical connector comprising a plurality of connector modules, each connector module comprising a pair of signal conductors, each signal conductor of the pair comprising:

a mating contact portion;

a contact tail; and an intermediate portion coupling the mating contact portion to the contact tail; and an extender module assembly, comprising:

a plurality of extender modules, each extender module comprising a pair of elongated signal conductors having a first end and a second end, each signal conductor of the pair comprising:

a first contact portion at the first end;

a second contact portion at the second end comprising a receptacle; and an intermediate portion coupling the first contact portion to the second contact portion, wherein the mating contact portions of the plurality of connector modules are received in the receptacles of the plurality of extender modules and the first contact portions are configured to engage mating contact portions of the second electrical connector.

20. The electrical connector system of claim 19, wherein the first contact portions of the plurality of extender modules are configured to mate with corresponding contact portions of another electrical connector.

21. The electrical connector system of claim 19, further comprising:

an extender shell attached to the electrical connector and supporting the plurality of extender modules with the first contact portions arranged in an array.

22. The electrical connector system of claim 19, wherein:

the first contact portions of the pair of elongated signal conductors of each of the plurality of extender modules are positioned along a respective first line and extend in a first direction;

the second contact portions of the pair of elongated signal conductors of each of the plurality of extender modules are positioned along a respective second line and extend parallel to the first direction; and each first line is angularly offset from each respective second line.

23. The electrical connector system of claim 22, wherein each first line is orthogonal to each respective second line.

24. The electrical connector system of claim 19, wherein each extender module of the plurality of extender modules further comprises insulating material formed as a single portion.

25. The electrical connector system of claim 19, wherein each extender module of the plurality of extender modules further comprises insulating material having a first region and a second region that is orthogonal to the first region, the pair of elongated signal conductors of the extender module being disposed within the first and second regions of the insulating material.

26. The electrical connector system of claim 25, wherein each extender module of the plurality of extender modules further comprises first and second conductive shield elements disposed on opposing sides of the first region of the insulating material, respectively, and on opposing sides of the second region of the insulating material, respectively.

27. The electrical connector system of claim 19, wherein each extender module of the plurality of extender modules further comprises first and second conductive shield elements disposed on respective first and second opposing sides of the pair of elongated signal conductors of the extender module.

28. The electrical connector system of claim 19, wherein the contact tails of each pair of signal conductors of the plurality of connector modules comprise spring contacts.

* * * * *